(12) United States Patent
Dueri et al.

(10) Patent No.: US 11,735,818 B2
(45) Date of Patent: Aug. 22, 2023

(54) ONE-DIMENSIONAL PHASED ARRAY ANTENNA AND METHODS OF STEERING SAME

(71) Applicant: Space Exploration Technologies Corp., Hawthorne, CA (US)

(72) Inventors: Daniel A. Dueri, Renton, WA (US); Raymond Tyler Rowe, Bothell, WA (US); Robert Baummer, Jr., Redmond, WA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 79 days.

(21) Appl. No.: 17/405,552

(22) Filed: Aug. 18, 2021

(65) Prior Publication Data

US 2022/0109235 A1    Apr. 7, 2022

Related U.S. Application Data

(60) Provisional application No. 63/067,046, filed on Aug. 18, 2020.

(51) Int. Cl.
*H01Q 3/34* (2006.01)
*H04B 7/195* (2006.01)

(52) U.S. Cl.
CPC .............. *H01Q 3/34* (2013.01); *H04B 7/195* (2013.01)

(58) Field of Classification Search
CPC .. H01Q 3/34; H01Q 3/06; H01Q 3/08; H01Q 3/36; H01Q 21/061; H01Q 21/08
See application file for complete search history.

(56) References Cited

U.S. PATENT DOCUMENTS

2018/0254824 A1*   9/2018  Speidel .............. H04B 7/18532
2018/0323863 A1*  11/2018  Bournes ............. H04B 7/18508

* cited by examiner

*Primary Examiner* — Khaled M Kassim
*Assistant Examiner* — Najeeb Ansari
(74) *Attorney, Agent, or Firm* — Polsinelli PC

(57) ABSTRACT

In one embodiment of the present disclosure, a method is provided for configuring an endpoint terminal for communication with a plurality of satellites in non-geosynchronous orbit. The endpoint terminal has an antenna system defining a limited field of regard for satellite communication. The antenna system is capable of gimbaling in order to move the field of regard. The method includes orienting the field of regard in a first position to communicate with a first satellite traveling in a first orbital plane; gimbaling the antenna system to move the field of regard from the first position to a second position to communicate with a second satellite traveling in a second orbital plane; establishing communication with the second satellite; and as the second satellite travels in the second orbital plane, gimbaling the antenna system to move the field of regard from the second position to a third position.

24 Claims, 31 Drawing Sheets

ONE-DIMENSIONAL PHASED ARRAY ANTENNA AND METHODS OF STEERING SAME

CROSS-REFERENCE TO RELATED APPLICATIONS

The present application claims priority to U.S. Provisional Patent Application No. 63/067,046, filed Aug. 18, 2020, entitled ONE-DIMENSIONAL PHASED ARRAY ANTENNA AND METHODS OF STEERING SAME, the disclosure of which is hereby expressly incorporated by reference herein in its entirety.

BACKGROUND

Communication satellites receive and transmit radio signals to and from the surface of Earth for the purpose of providing communication services. In conventional satellite technology, only a few locations on Earth were in view of a satellite at any given time to transmit and/or receive signals to and/or from a satellite. In more modern satellite technology, it is desirable for every place on Earth to be provided communication services at all times, a capability which may be referred to as universal or global coverage. In addition to global coverage, some locations on Earth, such as densely populated areas, require more communication capacity than others.

For global coverage having reduced latency, communication systems may employ non-geostationary satellites. Geostationary-Earth orbit (GEO) satellites orbit the equator with an orbital period of exactly one day at a high altitude, flying approximately 35,786 km above mean sea level. Therefore, GEO satellites remain in the same area of the sky as viewed from a specific location on Earth. In contrast, non-geostationary satellites typically operate in low-Earth or mid-Earth orbit (LEO or MEO) and do not remain stationary relative to a specific location on Earth.

Satellite constellations are needed with improved global coverage and improved communication capacity without interfering with existing satellite communication systems. Embodiments of the present disclosure are directed to fulfilling these and other needs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a method is provided for configuring an endpoint terminal for communication with a satellite constellation including a plurality of satellites in non-geosynchronous orbit (non-GEO). At least a first plurality of satellites travel in a first orbital plane and a second plurality of satellites travel in a second orbital plane, wherein the first orbital plane intersects the second orbital plane at an intersection. The method includes configuring the endpoint terminal having an Earth-based geographic location, the endpoint terminal having an antenna system defining a field of regard for communicating with the satellite constellation. The field of regard is a limited field of regard, and the antenna system is configured for electronically steering along a first steering axis in first and second steering directions, wherein the antenna system is capable of gimbaling in order to move the field of regard along a first gimbaling axis in first and second gimbaling directions. The method includes orienting the field of regard in a first position, wherein the antenna system when the field of regard is at the first position is capable of communicating with at least one of the first plurality of satellites traveling within the first orbital plane. The method includes, as the first orbital plane precesses around a rotational axis of the Earth, gimbaling the antenna system to move the field of regard along the first gimbaling axis in the first gimbaling direction from the first position to a second position, wherein the antenna system when the field of regard is at the second position is capable of communicating with at least one satellite from the first plurality of satellites traveling in the first orbital plane and one satellite from the second plurality of satellites traveling in the second orbital plane, wherein the second position is at or near the intersection of the first and second orbital planes, and wherein the antenna system remains in communication with satellites from the first plurality of satellites traveling in the first orbital plane while the field of regard moves from the first position to the second position. The method includes establishing communication between the antenna system and the one satellite from the second plurality of satellites traveling in the second orbital plane. The method includes, as the one satellite from the second plurality of satellites travels along the second orbital plane, gimbaling the antenna system to move the field of regard in the second gimbaling direction along the first gimbaling axis from the second position to a third position, wherein the one satellite from the second plurality of satellites remains in communication with the antenna system while the field of regard moves from the second position to the third position.

In some embodiments, a communication system for communicating with a satellite constellation including a plurality of satellites in non-GEO orbit is provided. At least a first plurality of satellites travel in a first orbital plane and a second plurality of satellites travel in a second orbital plane, wherein the first orbital plane intersects the second orbital plane at an intersection. The system includes an endpoint terminal having an Earth-based geographic location and an antenna system coupled to the endpoint terminal, wherein the antenna system defines a field of regard for communicating with the satellite constellation. The field of regard is a limited field of regard, wherein the antenna system is configured for electronically steering along a first steering axis in first and second steering directions, and wherein the endpoint terminal is capable of gimbaling in order to move the field of regard along a first gimbaling axis in first and second gimbaling directions. The endpoint terminal orients the field of regard in a first position, wherein the antenna system when the field of regard is at the first position is capable of communicating with at least one of the first plurality of satellites traveling within the first orbital plane. The endpoint terminal, as the first orbital plane precesses around a rotational axis of the Earth, gimbals the antenna system to move the field of regard along the first gimbaling axis in the first gimbaling direction from the first position to a second position. The antenna system when the field of regard is at the second position is capable of communicating with at least one satellite from the first plurality of satellites traveling in the first orbital plane and one satellite from the second plurality of satellites traveling in the second orbital plane, wherein the second position is at or near the intersection of the first and second orbital planes, and wherein the antenna system remains in communication with satellites from the first plurality of satellites traveling in the first orbital plane while the field of regard moves from the first position to the second position. The endpoint terminal establishes communication between the antenna system and the one satellite from the second plurality of satellites traveling in the second orbital plane. The endpoint terminal, as the one satellite from the second plurality of satellites travels along the second orbital plane, gimbals the antenna system to move the field of regard in the second gimbaling direction along the first gimbaling axis from the second position to a third position, wherein the one satellite from the second plurality of satellites remains in communication with the antenna system while the field of regard moves from the second position to the third position.

In some embodiments, a method is provided for configuring an endpoint terminal for communication with a satellite constellation including a plurality of satellites in non-GEO orbit. At least a first plurality of satellites travel in a first orbital plane, a second plurality of satellites travel in a second orbital plane, and a third plurality of satellites travel in a third orbital plane, wherein the first orbital plane intersects the second orbital plane at a first intersection, and wherein the second orbital plane intersects the third orbital plane at a second intersection. The method includes configuring the endpoint terminal having an Earth-based geographic location, the endpoint terminal having an antenna system defining a field of regard for communicating with the satellite constellation. The field of regard is a limited field of regard, and the antenna system is configured for electronically steering along a first steering axis, wherein the antenna system is capable of gimbaling in order to move the field of regard along a first gimbaling axis in first and second directions. The method includes orienting the field of regard in a first position, wherein the field of regard at the first position is capable of communicating with at least two of the first plurality of satellites traveling within the first orbital plane. The method includes, as the first orbital plane precesses along a rotational axis of the Earth, gimbaling the antenna system to move the field of regard along the first gimbaling axis in the first gimbaling direction from the first position to a second position, wherein the field of regard is capable of continuously communicating with at least one satellite from the first plurality of satellites traveling within the first orbital plane while the field of regard moves from the first position to the second position, wherein the second position is at or near the first intersection of the first and second orbital planes, and wherein the field of regard at the second position is capable of communicating with at least at least one satellite from the first plurality of satellites traveling in the first orbital plane and one satellite from the second plurality of satellites traveling in the second orbital plane. The method includes establishing communication with the one satellite from the second plurality of satellites traveling in the second orbital plane. The method includes, as the one satellite from the second plurality of satellites travels along the second orbital plane, gimbaling the antenna system to move the field of regard along first gimbaling axis in the second gimbaling direction from the second position to a third position, wherein the third position is at or near the second intersection of the second and third orbital planes, and wherein the field of regard at the third position is capable of communicating with the one satellite from the second plurality of satellites traveling in the second orbital plane and at least one satellite from the third plurality of satellites traveling within the third orbital plane.

In some embodiments, an endpoint terminal is provided for communication with a satellite constellation including a plurality of satellites in non-GEO orbit. At least a first plurality of satellites travel in a first orbital plane and a second plurality of satellites travel in a second orbital plane, wherein the first orbital plane intersects the second orbital plane at an intersection. The endpoint terminal includes a mount that secures the endpoint terminal to an Earth-based location. The endpoint terminal includes an antenna array defining a field of regard for communicating with the satellite constellation, wherein the field of regard is a limited field of regard, and wherein the antenna array is configured for unidimensional electronic steering in first and second steering directions. The endpoint terminal includes a gimbaling mechanism that gimbals the antenna array in order to move the field of regard along a first gimbaling axis in first and second gimbaling directions. The endpoint terminal includes at least one processing device communicatively coupled to the gimbaling mechanism and the antenna array, wherein the processing device orients the field of regard in a first position. The antenna system when the field of regard is at the first position is capable of communicating with at least one of the first plurality of satellites traveling within the first orbital plane. The processing device, as the first orbital plane precesses around a rotational axis of the Earth, gimbals the antenna system to move the field of regard along the first gimbaling axis in the first gimbaling direction from the first position to a second position. The antenna system when the field of regard is at the second position is capable of communicating with at least one satellite from the first plurality of satellites traveling in the first orbital plane and one satellite from the second plurality of satellites traveling in the second orbital plane, wherein the second position is at or near the intersection of the first and second orbital planes, and wherein the antenna system remains in communication with satellites from the first plurality of satellites traveling in the first orbital plane while the field of regard gimbals from the first position to the second position. The processing device establishes communication between the antenna system and the one satellite from the second plurality of satellites traveling in the second orbital plane. The processing device, as the one satellite from the second plurality of satellites travels along the second orbital plane, gimbals the antenna system to move field of regard in the second gimbaling direction along the first gimbaling axis from the second position to a third position, wherein the one satellite from the second plurality of satellites remains in communication with the antenna system while the field of regard gimbals from the second position to the third position.

In any of the embodiments described herein, the first plurality of satellites may travel in the first orbital plane at a first inclination and the second plurality of satellites travel in the second orbital plane at a second inclination, the first inclination being different from the second inclination.

In any of the embodiments described herein, the right ascension of the ascending nodes (RAANs) of the first plurality of satellites traveling in the first orbital plane may be offset by a first amount relative to RAANs of the second plurality of satellites traveling in the second orbital plane.

In any of the embodiments described herein, the methods, system, or endpoint terminal may further establish communication with a satellite from a third plurality of satellites traveling in a third orbital plane when the field of regard is at the third position, wherein RAANs of the third plurality of satellites traveling in the third orbital plane are offset by a second amount relative to the RAANs of the first plurality of satellites traveling in the first orbital plane.

In any of the embodiments described herein, the RAANs of the first plurality of satellites traveling in the first orbital plane may be adjacent to the RAANs of the third plurality of satellites traveling in the third orbital plane.

In any of the embodiments described herein, the first gimbaling axis may be substantially aligned with an axis of precession of the first orbital plane.

In any of the embodiments described herein, moving the field of regard along the first gimbaling axis from the first position to the second position may include gimbaling the antenna system at a first gimbaling rate that substantially corresponds to a precession rate of the axis of precession.

In any of the embodiments described herein, moving the field of regard along the first gimbaling axis from the second position to the third position may include gimbaling the antenna system at a second gimbaling rate that substantially corresponds to an orbital velocity of the one satellite from the second plurality of satellites within the second orbital plane.

In any of the embodiments described herein, the first gimbaling rate may be different from the second gimbaling rate.

In any of the embodiments described herein, the second gimbaling direction may be the reverse of the first gimbaling direction.

In any of the embodiments described herein, the methods, system, or endpoint terminal may further select the second position by determining, based on a model that predicts movement of satellites within the satellite constellation, a position wherein: the antenna system is capable of communicating with at least one satellite from the first plurality of satellites and the one satellite from the second plurality of satellites; and the field of regard has less than a threshold amount of overlap with a GEO-belt interference zone.

In any of the embodiments described herein, selecting the second position may further include determining that a communication load of the one satellite from the second plurality of satellites is less than a threshold communication load when the field of regard is at the second position.

In any of the embodiments described herein, the methods, system, or endpoint terminal may further predict, based on the model, a first point in time at which the field of regard is positioned at the second position; and direct, at the first point in time, the antenna system to switch from communicating with a satellite from the first plurality of satellites to communicating with the one satellite from the second plurality of satellites.

In any of the embodiments described herein, the methods, system, or endpoint terminal may further select the third position by predicting, based on the model, a position wherein: the antenna system is capable of communicating with at least one satellite from a third plurality of satellites traveling in a third orbital plane and the one satellite from the second plurality of satellites; and a communication load of the at least one satellite from the third plurality of satellites is less than the threshold communication load when the field of regard is at the position.

In any of the embodiments described herein, the methods, system, or endpoint terminal may further predict, based on the model, a second point in time at which the field of regard is positioned at the third position; and direct, at the second point in time, the endpoint terminal to switch from communicating with the one satellite in the second orbital plane to communicating with one satellite from the third plurality of satellites.

In any of the embodiments described herein, the first steering direction may be substantially orthogonal to the first and second gimbaling directions.

In any of the embodiments described herein, the methods, system, or endpoint terminal may maintain continuous communication between the antenna system and satellites within the first plurality of satellites while the field of regard gimbals from the first position to the second position.

In any of the embodiments described herein, maintaining the continuous communication between the antenna system and satellites within the first plurality of satellites may include: while the field of regard is at the first position, establishing communication between the antenna system and a first satellite from the first plurality of satellites; as the first satellite from the first plurality of satellites travels along the first orbital plane, electronically steering the antenna system to track the first satellite from the first plurality of satellites; and while the antenna system is still capable of communicating with the first satellite from the first plurality of satellites, establishing communication between the antenna system and a second satellite from the first plurality of satellites.

In any of the embodiments described herein, the second satellite from the first plurality of satellites may be closer to the Earth-based geographic location of the endpoint terminal than the first satellite from the first plurality of satellites when communication is established with the second satellite from the first plurality of satellites.

In any of the embodiments described herein, the methods, system, or endpoint terminal may maintain continuous communication with the one satellite from the second plurality of satellites while the field of regard gimbals from the second position to the third position.

In any of the embodiments described herein, the methods, system, or endpoint terminal may, when the field of regard is at the third position, establish communication between the antenna system and one satellite from a third plurality of satellites traveling in a third orbital plane; and as the one satellite from the third plurality of satellites travels along the third orbital plane, gimbal the antenna system to move the field of regard along a second gimbaling axis in a third gimbaling direction from the third position to a fourth position.

In any of the embodiments described herein, the methods, system, or endpoint terminal may further determine the second position using a model that predicts movement of satellites within the satellite constellation.

In any of the embodiments described herein, the methods, system, or endpoint terminal may further determine, based at least in part on the model, a fourth position wherein the antenna system is capable of communicating with at least one satellite from the first plurality of satellites and one satellite from a fourth plurality of satellites traveling in a fourth orbital plane.

In any of the embodiments described herein, the methods, system, or endpoint terminal may further determine that a communication load of the one satellite from the fourth plurality of satellites exceeds a communication load of the one satellite from the second plurality of satellites; and determine, based at least in part on the communication load of the one satellite from the fourth plurality of satellites exceeding the communication load of the one satellite from the second plurality of satellites, to move the field of regard to the second position in order to establish communication with the one satellite from the second plurality of satellites instead of moving the field of regard to the fourth position in order to establish communication with the one satellite from the fourth plurality of satellites.

In any of the embodiments described herein, determining to move the field of regard to the second position instead of moving the field of regard to the fourth position may include receiving, from a remote sever that monitors communication loads of satellites within the satellite constellation, an instruction to establish communication with the one satellite from the second plurality of satellites.

In any of the embodiments described herein, the antenna array may include a linear antenna array.

In any of the embodiments described herein, the antenna array may include a curvilinear antenna array.

In any of the embodiments described herein, the endpoint terminal may further include a parabolic trough that reflects signals transmitted by the antenna array, wherein a shape of the parabolic trough defines a shape of the field of regard.

In any of the embodiments described herein, the endpoint terminal may further include a lens that focuses signals transmitted by the antenna array, wherein a shape of the lens defines a shape of the field of regard.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
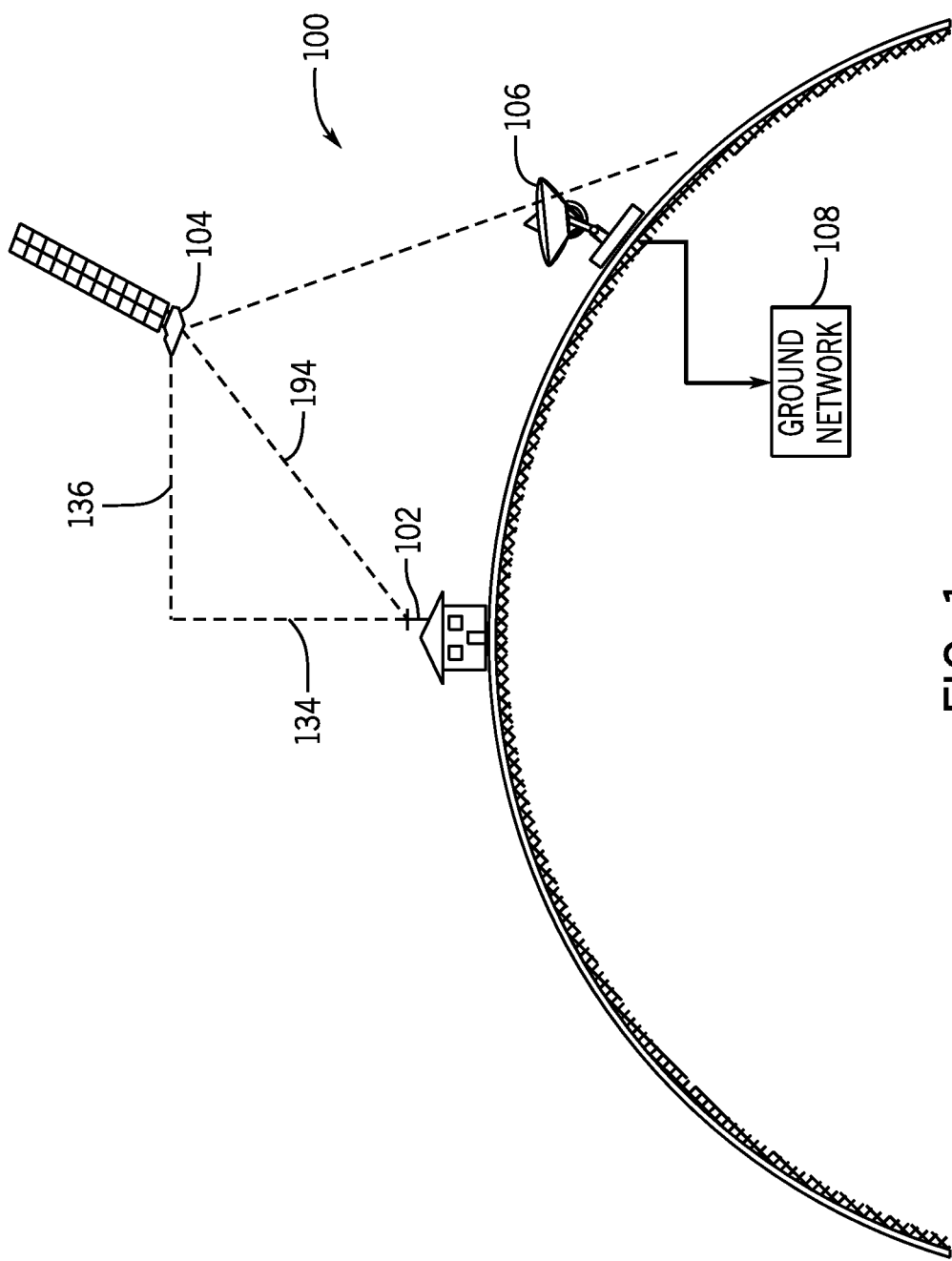
FIG. 1 is a not-to-scale schematic diagram illustrating a simple example of communication in a satellite communication system.

Systems are currently being deployed to provide high-bandwidth, low-latency network communication via constellations of satellites in low Earth orbit (LEO). FIG. 1 is a not-to-scale schematic diagram that illustrates a simple example of communication in such a system 100. An end-point terminal 102 is installed at a house, a business, a vehicle, or another location where it is desired to obtain communication access via a network of satellites. A communication path is established between the endpoint terminal 102 and a first satellite 104. In the illustrated embodiment, the first satellite 104, in turn, establishes a communication path with a gateway terminal 106. In another embodiment, the first satellite 104 may establish a communication path with another satellite prior to communication with a gateway terminal 106. The gateway terminal 106 is physically connected via fiber optic, Ethernet, or another physical connection to a ground network 108. The ground network 108 may be any type of network, including the Internet.

Latency of communication between the endpoint terminal 102 and the ground network 108 is determined at least in part by the distance between the endpoint terminal 102 and the satellite 104, and the distance between the satellite 104 and the gateway terminal 106. For previous satellite communication systems that used satellites in geosynchronous or geostationary Earth orbit (GEO), the large distances involved created high amounts of latency. Therefore, it is desirable to use constellations of satellites in non-GEO orbit, for example, low Earth orbit (LEO), for communication systems.

Embodiments of the present disclosure are directed to configurations for endpoint terminals 102 (or user terminals) to optimize network communications to and from the satellite. In particular, the exemplary embodiments disclosed herein relate to systems and methods for orienting endpoint terminals 102 based on latitude position or other relevant data, including proximity to population centers or natural features, of the Earth-based end point terminal.

For the purposes of global satellite coverage applications, for example, for global internet coverage, a large number of satellites are needed defining a predictable grid of satellite coverage. If there are not enough satellites in a predictable grid, frequent service outages may occur. The design of the constellation of satellites to meet the needs of the communication application is a function of desired satellite altitude and inclination pairing, antenna characteristics, and the design of the satellite ground tracks, all described in greater detail below.

An Earth-based endpoint terminal 102 may be a terminal connected to Earth or as a non-orbiting body positioned in the Earth's atmosphere, such as a non-mobile atmospheric platform. For example, an Earth-based endpoint terminal 102 may be in Earth's troposphere, such as within about 10 kilometers (about 6.2 miles) of the Earth's surface, and/or within the Earth's stratosphere, such as within about 50 kilometers (about 31 miles) of the Earth's surface, for example on a stationary (or approximately stationary) object, such as a balloon.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Many embodiments of the technology described herein may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above.

Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display or LCD.

Satellite Constellations

The satellite constellations of the present disclosure are in non-geostationary orbits. A satellite in a geostationary orbit is at an altitude of approximately 35,786 km above mean sea level. Satellite constellations of the present disclosure are at lower altitudes. In one embodiment of the present disclosure, the satellite constellation of the present disclosure is at an altitude of less than 10,000 km. In another embodiment, the satellite constellation of the present disclosure is in a low Earth orbit at an altitude of less than 2000 km. In another embodiment, the satellite constellation of the present disclosure is in a very low Earth orbit at an altitude of less than 500 km.

User or endpoint terminals 102 of the present systems 100 are designed and configured in accordance with embodiments of the present disclosure to work in conjunction with LEO satellite constellations. Because LEO satellite constellations, unlike GEO satellite constellations, do not remain stationary relative to a specific location on Earth, such changes are accommodated in the design of the satellite constellation and the user terminals 102. The drifting nature of LEO satellite constellations is described in greater detail below.

Unsynchronized (Drifting) Orbital Planes

Figure 2A:
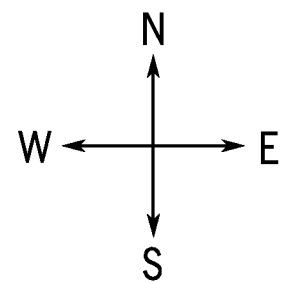
FIGS. 2A and 2B are schematic diagrams illustrating first and second satellite systems having different inclinations and similar altitudes resulting in drifting orbital planes in accordance with previously developed satellite constellation technology.
Figure 2A:
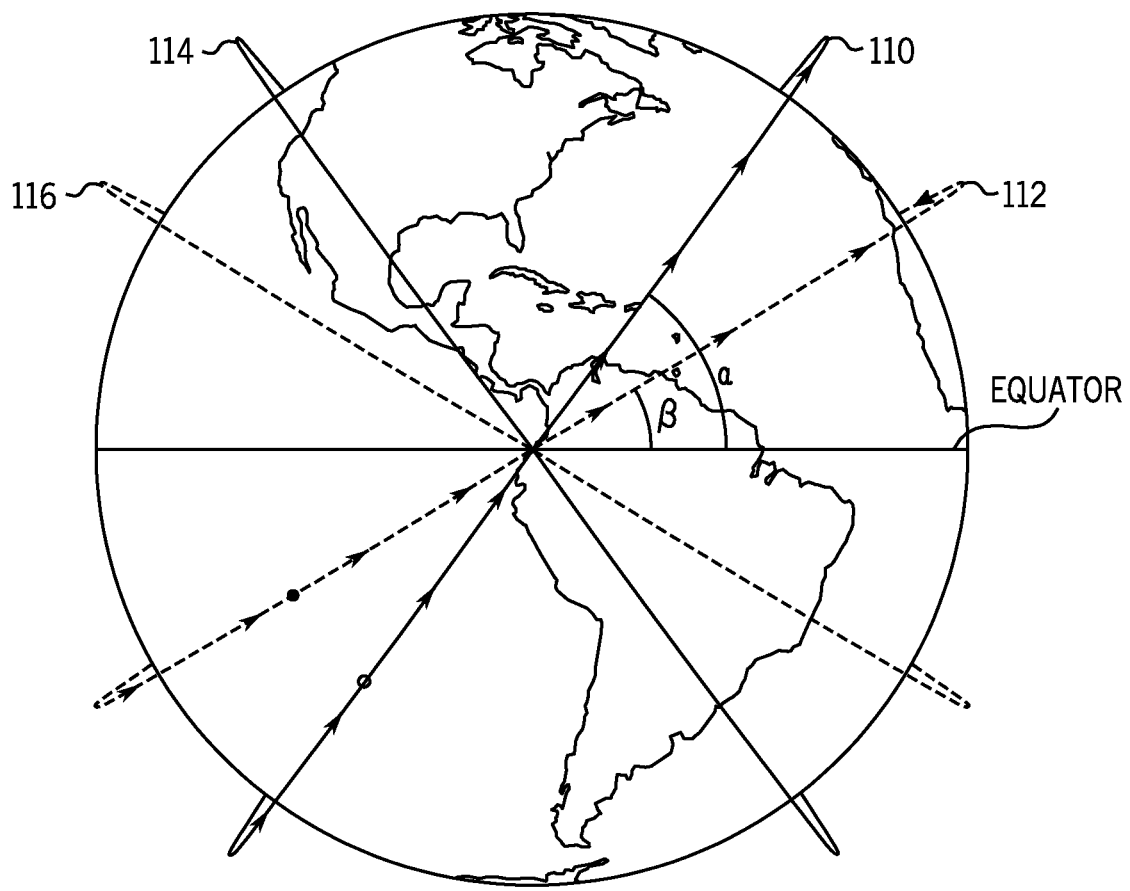

Referring to FIG. 2A, a constellation of satellites is provided. The constellation shows four satellite orbits in four different orbital planes, including satellites sets 110, 112, 114, 116. For simplification in the illustrated embodiment, the satellite sets include one satellite. However, in accordance with embodiments of the present disclosure, each satellite set includes a plurality of satellites spaced throughout the path of an orbital plane.

Satellite sets 110, 112, 114, 116 are at similar altitudes, but at different inclinations, inclinations angle $\alpha$ and inclination angle $\beta$. For example, set 110 is at an inclination $\alpha$ of about 55 degrees relative to the equator and set 112 is at an inclination $\beta$ of about 32 degrees relative to the equator. Satellite sets 114 and 116 mirror satellite sets 110 and 112.

The altitudes of the satellite sets are not necessarily exactly the same, but they are within close range of each other, such that altitude is a minimal factor in the different operating characteristics of the first and second satellite sets 110 and 112. For example, satellite set 110 and satellite set 112 may be in an altitude range of a few kilometers, or less than 200 km.

Figure 2B:
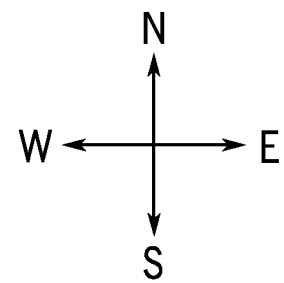
Figure 2B:
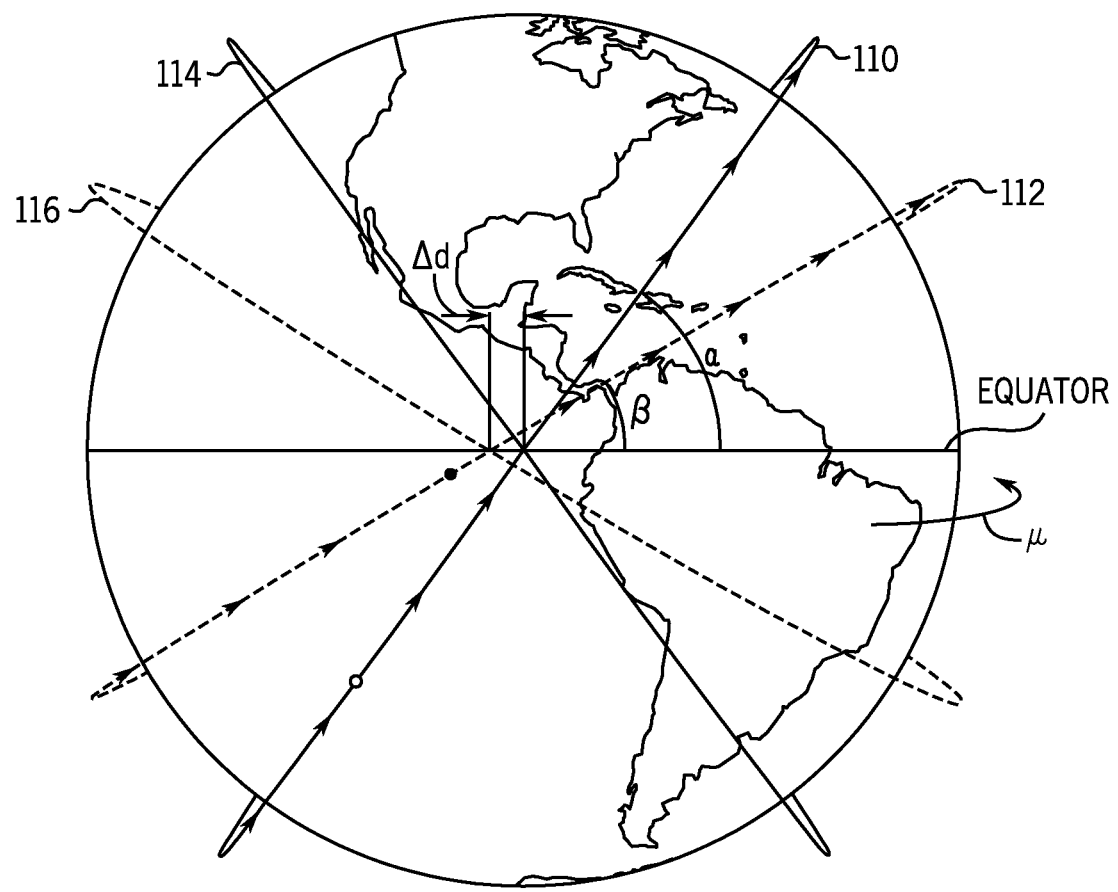

Referring to FIG. 2B, the two satellite sets 110 and 112 of FIG. 1A have different westward drift rates in view of their different inclinations $\alpha$ and $\beta$. Therefore, after a period of time, as the Earth rotates in the eastward direction as indicated by arrow $\mu$, both satellite sets 110 and 112 have drifted westward. However, the second set of satellites 112 has drifted more westward than the first set of satellites 110, as shown by drift differential $\Delta d$.

The drift differential $\Delta d$ between the first and second satellite sets 110 and 112 can be undesirable because it adds uncertainty to the meshing between the two areas of coverage by the two satellite sets 110 and 112. Meshing or interleaving between satellite sets can be desirable in communication systems that depend on a known satellite constellation for predictable satellite coverage.

Synchronized (Fixed Drift) Orbital Planes

Figure 3:
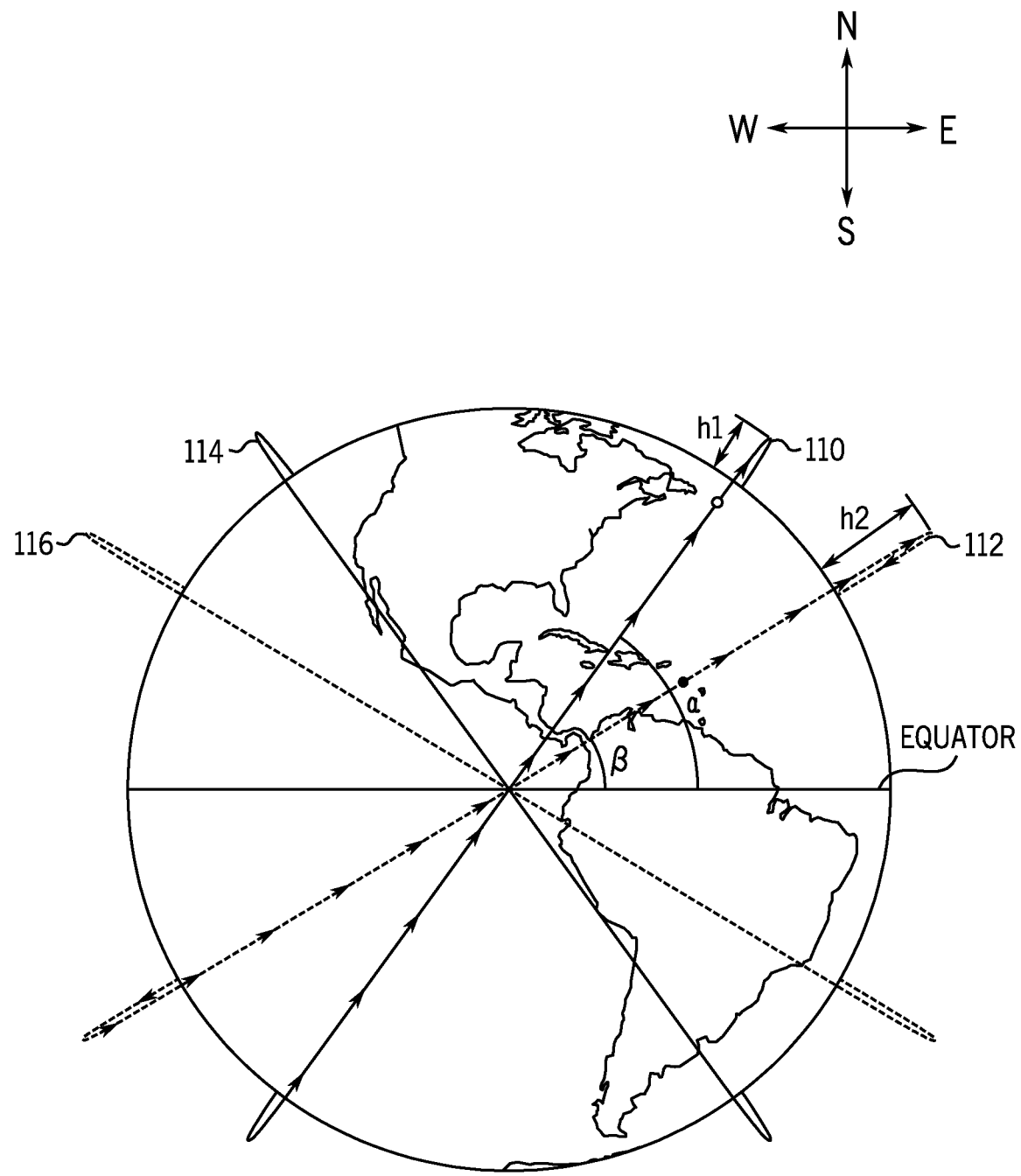
FIG. 3 is a schematic diagram illustrating first and second satellite systems having different inclinations and different altitudes resulting in non-drifting orbital planes in accordance with previously developed satellite constellation technology.

Referring to FIG. 3, one solution for reducing the difference in drift rate between two satellite systems in accordance with previously developed technology is to fly the two satellite systems at two different altitudes and/or at two different eccentricities. See altitude h1 for satellite set A and altitude h2 for satellite set 112. The altitude difference between the two satellite systems 110 and 112 can be fixed such that the precession of the right ascension of the ascending node (RAAN) is identical for the satellites in either satellite orbital plane.

Figure 4:
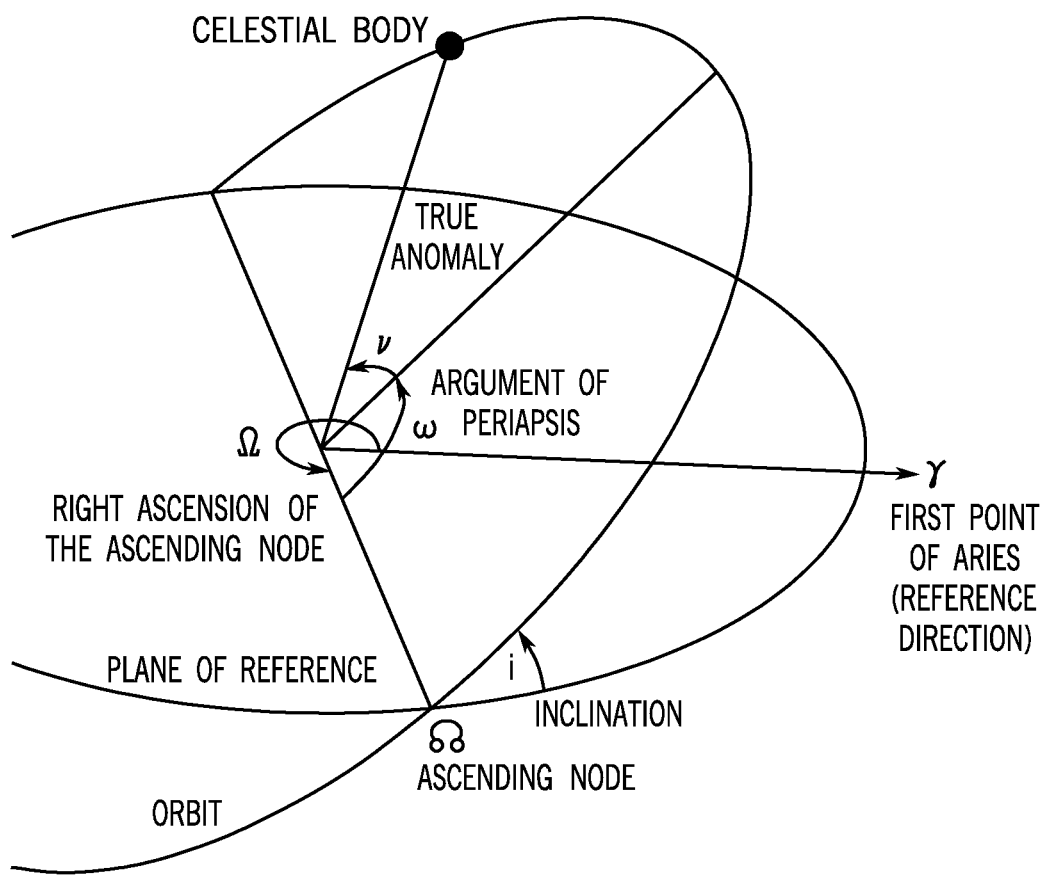
FIG. 4 is a schematic diagram illustrating the ascending node of an orbiting body in accordance with embodiments of the present disclosure.

Referring to FIG. 4, for a geocentric orbit of an object orbiting Earth, Earth's equatorial plane is the reference plane and the First Point of Aries γ (which is considered to be the celestial "Prime Meridian") is the origin of longitude. In an inertial frame with the Earth rotating, the longitude of the orbit is wherein the orbit crosses the plane of reference measured from the reference direction γ, measured eastwards (or, as seen from the north, counterclockwise) from the First Point of Aries γ to the ascending node Ω, and is called the right ascension of the ascending node (RAAN). Three numbers orient an orbital plane in space: inclination, argument of perigee, and RAAN.

The longitude of the ascending node (LAN) is measured relative to the Prime Meridian (Greenwich Line), in the geographic coordinate system at which longitude is defined to be 0° dividing the Earth into the Eastern Hemisphere and the Western Hemisphere (in contrast to RAAN, which is measured relative to a celestial plane of reference).

Returning to FIG. 3, set 110 may, for example, be at an inclination α of about 55 degrees relative to the equator and an altitude of approximately 1150 km and set 112 may be at an inclination β of about 32 degrees relative to the equator and an altitude of approximately 2040 km. Because the precession of the RAAN for the two satellite systems is identical, the systems drift together in a locked drift such that they continue to mesh and be interleaved.

RAAN precession can be calculated using the following equation:

$$\dot{\Omega} = -\frac{3}{2}J_2\left(\frac{Radius_{Earth}}{p_A}\right)^2 n_A \cos i_A = -\frac{3}{2}J_2\left(\frac{Radius_{Earth}}{p_B}\right)^2 n_B \cos i_B$$

$$n = \sqrt{\frac{\mu}{a^3}}$$

$$p = a(1-e^2)$$

Wherein $\dot{\Omega}$ is RAAN precession, $J_2$ is Earth's oblateness, $Radius_{Earth}$ is the Earth's mean equatorial radius, i is the orbit inclination, a is the orbit semi-major axis, e is the orbit eccentricity, and μ is the Earth's gravitational parameter.

While a locked drift is desirable for satellite coverage, it may be difficult to acquire government licenses needed to operate two orbital satellite sets in two different altitudes required for a locked drift. In addition, satellites configured to fly at altitudes that are within close altitude range (for example, within an altitude range of less than about 200 km) can be designed with similar (if not the same) design characteristics. Satellites flying at vastly different altitudes present design challenges due to differences in flying conditions.

Therefore, user terminals can be designed to accommodate satellite set drift in the case of all satellites flying at the same inclination, or satellite drift differential in the case of satellites flying at different inclinations, or both.

Figure 5:
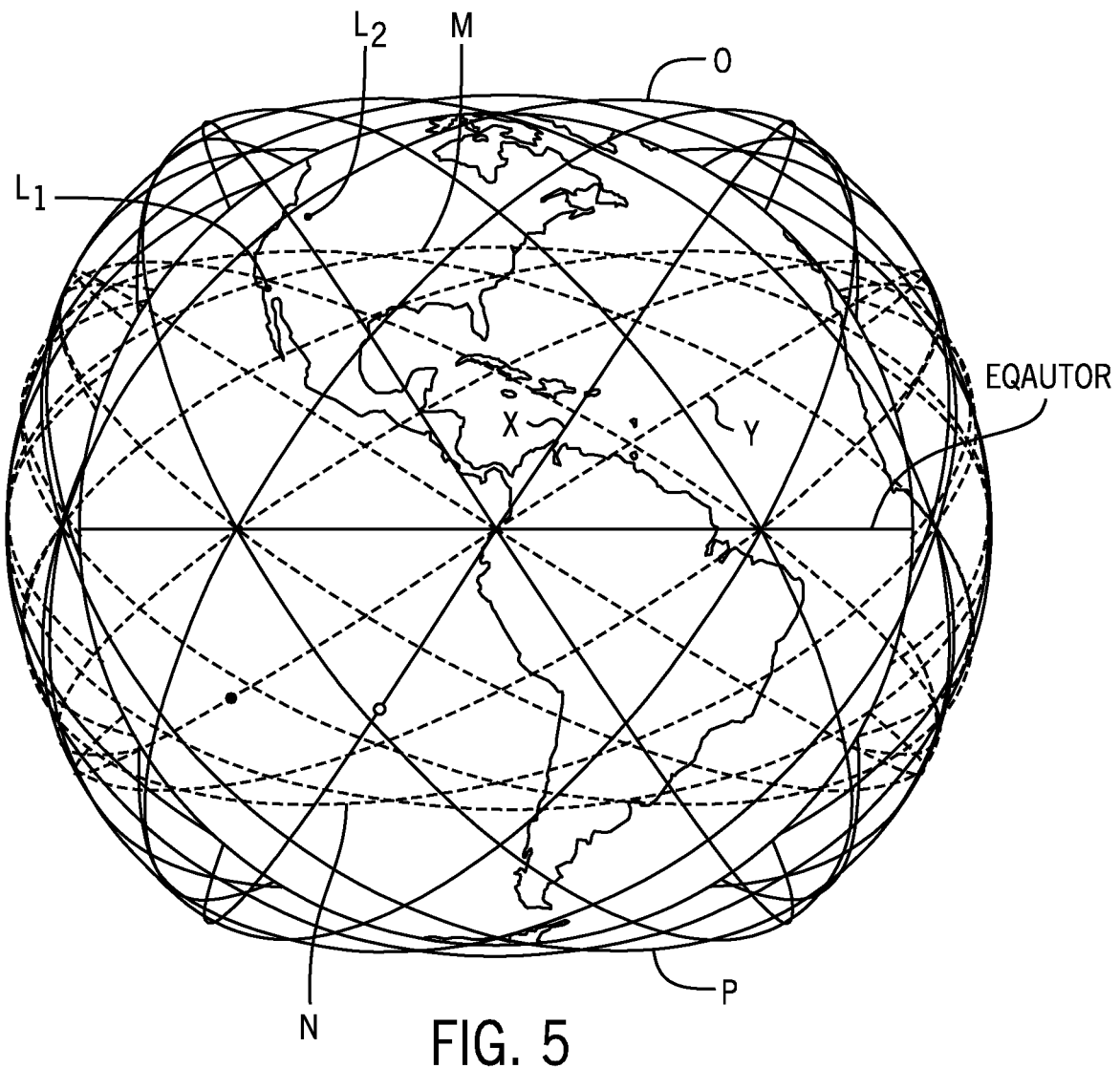
FIG. 5 is a schematic showing satellite planar orbital patterns on a rotating Earth for two different satellites as two different inclinations (without accounting for drift differential) in accordance with embodiments of the present disclosure.

Referring to FIG. 5, in a frame that rotates with the Earth, satellites in the first and second satellite sets X and Y are in discrete orbits, each defining an orbital path and each satellite set X and Y having a different inclination, similar to the satellite constellation. The satellite systems may be designed to be repeating ground track systems or may have a drifting pattern relative to the Earth's rotation rate.

Meshing or interleaving between satellite sets is desirable in communication systems that depend on a known satellite constellation for predictable satellite coverage, as illustrated below in EXAMPLES 1-3.

Example 1

One Inclination, One Ground Track

Figure 6A:
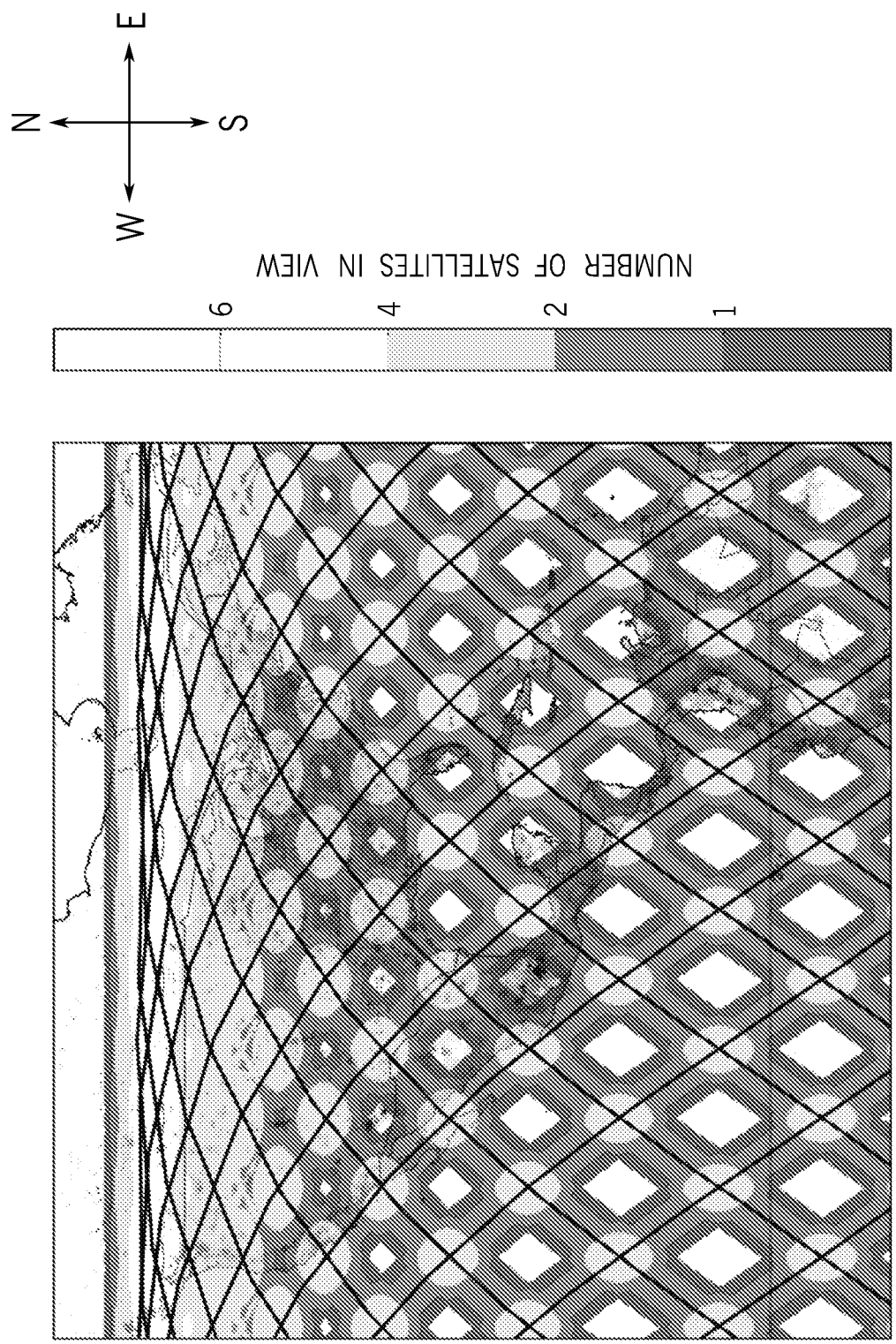
FIGS. 6A, 6B, and 6C are schematic diagrams illustrating examples of ground coverage for various satellite constellations in accordance with embodiments of the present disclosure.

Referring to FIG. 6A, an exemplary contour plot of satellite communication coverage is provided. The contour plot shows the mean number of satellites in view. The ground track includes 31 satellite revolutions every 2 days. The number of satellites is 2549 at altitude 345.6 km. The inclination of the satellite set is at 53.0. The spacecraft antenna nadir angle is 40.5 degrees, and the user terminal minimum elevation angle is 46.8 degrees.

The lines of the contour plot show the ground track of the satellites. The ground tracks may be repeating or non-repeating (i.e., moving slowly across the surface of the Earth, either East or West). The contour plot shows communication coverage increases where the ground tracks cross. The contour plot shows no communication coverage at a certain distance from the ground tracks.

Example 2

Two Inclinations, Two Ground Tracks

Figure 6B:
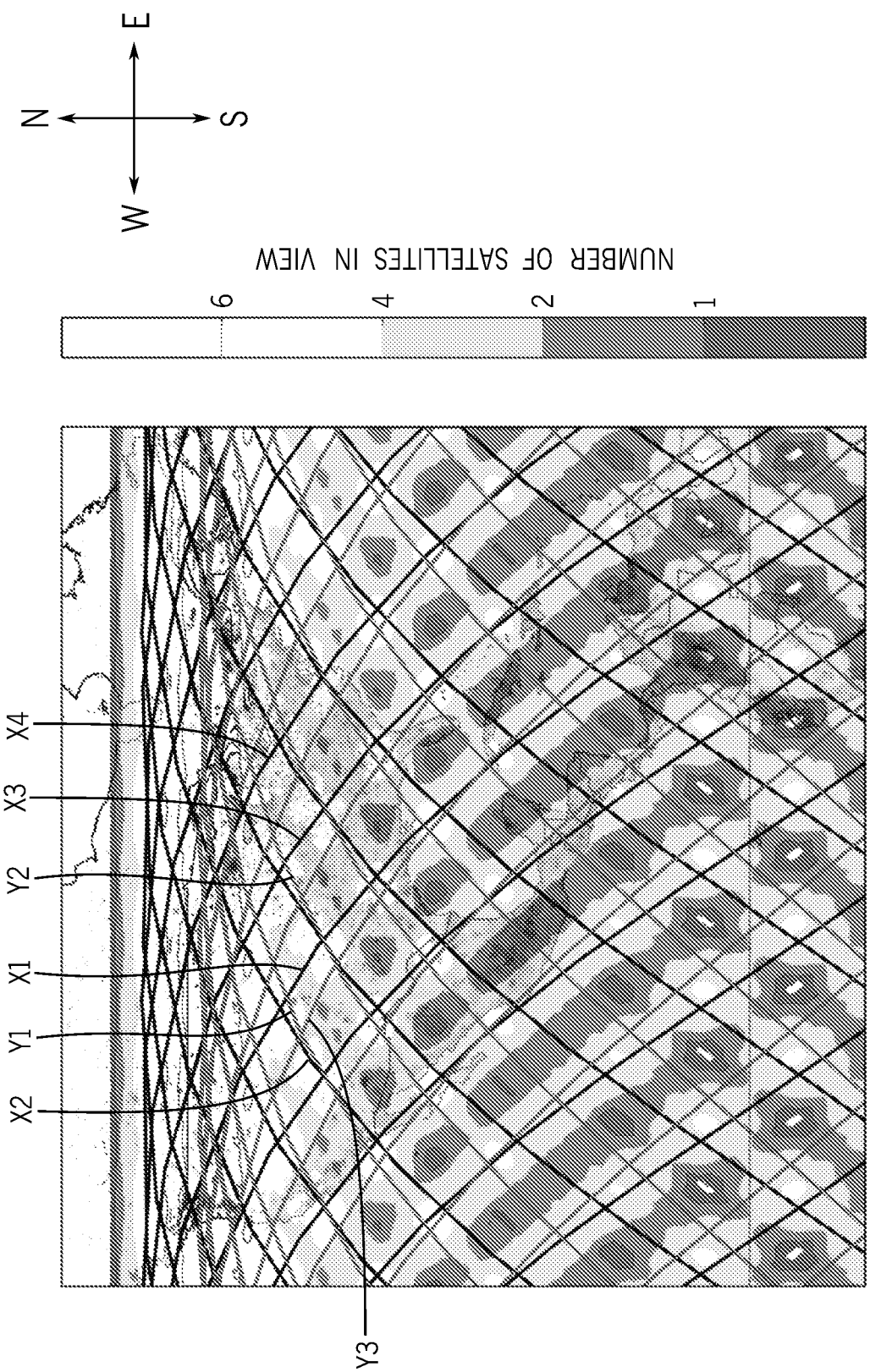

Referring to FIG. 6B, an exemplary contour plot of satellite communication coverage is provided. The contour plot shows the mean number of satellites in view. The first and second ground tracks each include 31 satellite revolutions every 2 days. The number of satellites in the two ground tracks is 5026 at altitudes 345.6 and 340.8. The inclinations of the satellite sets are at 53.0 and 48.0. The spacecraft antenna nadir angle is 40.5 degrees, and the user terminal minimum elevation angle is 46.8 degrees.

The lines of the contour plot show the first and second ground tracks of the satellites. The ground tracks may be repeating or non-repeating (i.e., moving slowly across the surface of the Earth, either East or West). The contour plot shows communication coverage increases compared to the communication coverage in EXAMPLE 1 as a result of the addition of the second ground track at a second inclination.

Example 3

Three Inclinations, Three Ground Tracks

Figure 6C:
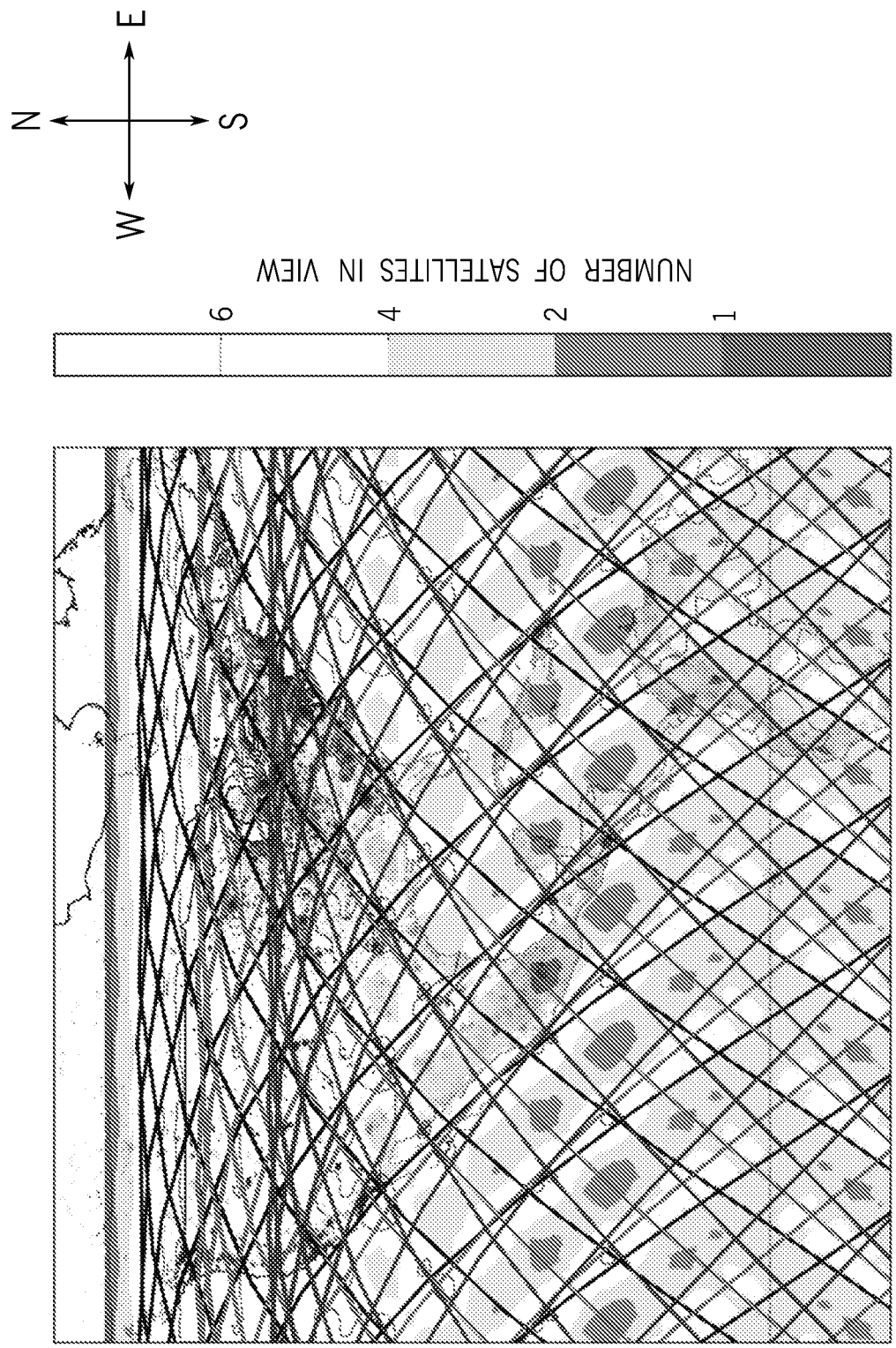

Referring to FIG. 6C, an exemplary contour plot of satellite communication coverage is provided. The contour plot shows the mean number of satellites in view. The first, second, and third ground tracks each include 31 satellite revolutions every 2 days. The number of satellites in the three ground tracks is 7518 at altitudes 345.6, 340.8, and 335.9 kms. The inclinations of the satellite sets are at 53.0, 48.0, and 42.0 degrees. The spacecraft antenna nadir angle is 40.5 degrees, and the user terminal minimum elevation angle is 46.8 degrees.

The lines of the contour plot show the first, second, and third ground tracks of the satellites. The ground tracks may be repeating or non-repeating (i.e., moving slowly across the surface of the Earth, either East or West). The contour plot shows significantly increased communication coverage increases compared to the communication coverage in EXAMPLES 1 and 2 as a result of the addition of the third ground track at a third inclination.

As seen in the three-dimensional satellite travel paths of FIG. 5 and the contour plots of FIGS. 6A, 6B, and 6C, the orbital track of satellites traveling at a certain inclination angle and the geometry of the Earth create a higher density of satellites near the northern-most and southern-most planes of latitude as compared to near the equator. Assuming each satellite set X or Y in FIG. 5 has a known number of equally spaced or substantially equally spaced satellites traveling in a planar orbit circling the Earth, the orbital pattern of a satellite constellation at a specific inclination angle (compare the orbital patterns of X and Y at different inclination angles) and the geometry of the Earth create a swarm of satellites at or near the upper and lower limiting latitudes of the orbital path.

For a prograde orbit, the upper and lower limiting latitudes of the orbital path (indicated as O and P for satellite set X in FIG. 5 or M and N for satellite set Y in FIG. 5) typically correspond to the angle of inclination of the satellite. For example, a satellite set Y having an angle of inclination of 42 degrees has upper and lower limiting latitudes M and N of 42 degrees north of the equator and 42 degrees south of the equator. For a retrograde orbit, the upper and lower limiting latitudes of the orbital path correspond to 180 degrees minus the inclination angle. For example, a satellite having an angle of inclination of 138 degrees also has and upper and lower limiting latitude of 42 degrees Likewise, a satellite set X having an angle of inclination of 53 degrees has upper and lower limiting latitudes O and P of 53 degrees north of the equator and 53 degrees south of the equator.

User Terminal Having a Steerable Beam and a Limited Field of Regard

In accordance with one embodiment of the present disclosure, a user terminal is configured for communication with a LEO satellite constellation consisting of satellites which emit or receive radio frequency (RF signals).

An antenna (e.g., a dipole antenna, parabolic antenna, or patch antenna) typically generates or receives radiation in a pattern that has a preferred direction, known as the main beam. Signal quality (e.g., signal to noise ratio or SNR), whether in transmitting or receiving scenarios, can be improved by aligning, or steering, the main beam of the antenna with a direction of the target or source of signal. In electronically steered antenna systems, a plurality of individual antenna elements are employed together to reorient, or steer, the main beam relative to those physically fixed antenna elements. In mechanically steered antenna systems, a single antenna or multiple antenna elements are physically moved to reorient the main beam.

Because LEO satellite constellations, unlike GEO satellite constellations, do not remain stationary relative to a specific location on Earth, the user terminal of the present embodiment is configured with an antenna system having an antenna aperture with at least one degree of freedom to orient this preferred direction of transmitting or receiving electromagnetic radiation. This steering may be accomplished either electronic or mechanical means, or a combination thereof.

In accordance with the embodiments of the present disclosure, the user terminal is incapable of steering its main beam to address the entire hemisphere of the sky as defined by the local horizon of the location of the user terminal on the Earth. This steering limitation is the result of mechanical, regulatory, or electrical limitations of the beam steering technology used in the user terminal. The area in which this antenna is capable of steering to for communication is referred to as the field of regard, or interchangeably the communication zone. An antenna which is incapable of steering its beam to address any arbitrary location within its local hemisphere of sky is referred hereafter as a limited field of regard antenna.

Phased Array Antenna

In accordance with one illustrative embodiment of the present disclosure, a user terminal may be configured with a phased array antenna that electronically steers in one or more directions. The phased array antenna includes a plurality of antenna elements distributed in one or more columns and/or rows. An antenna element (e.g., a dipole antenna) typically generates radiation in a pattern that has a preferred direction. For example, the generated radiation pattern is stronger in some directions and weaker in other directions. Likewise, when receiving electromagnetic signals, the antenna has the same preferred direction. Signal quality (e.g., signal to noise ratio or SNR), whether in transmitting or receiving scenarios, can be improved by aligning the preferred direction of the antenna with a direction of the target or source of signal. However, it is often impractical to physically reorient the antenna with respect to the target or source of signal. Additionally, the exact location of the source/target may not be known. To overcome some of the above shortcomings of the antenna, a phased array antenna can be formed from a set of antenna elements to simulate a large directional antenna. An advantage of the phased array antenna is its ability to transmit and/or receive signals in a preferred direction (i.e., the antenna's beamforming ability) without physically repositioning or reorienting the system.

In accordance with one embodiment of the present disclosure, a phased array antenna system is configured for communication with a satellite that emits or receives radio frequency (RF) signals. The antenna system includes a phased array antenna including a plurality of antenna elements distributed in one or more rows and/or columns and optionally a plurality of phase shifters configured for generating phase offsets between the antenna elements.

Figure 7:
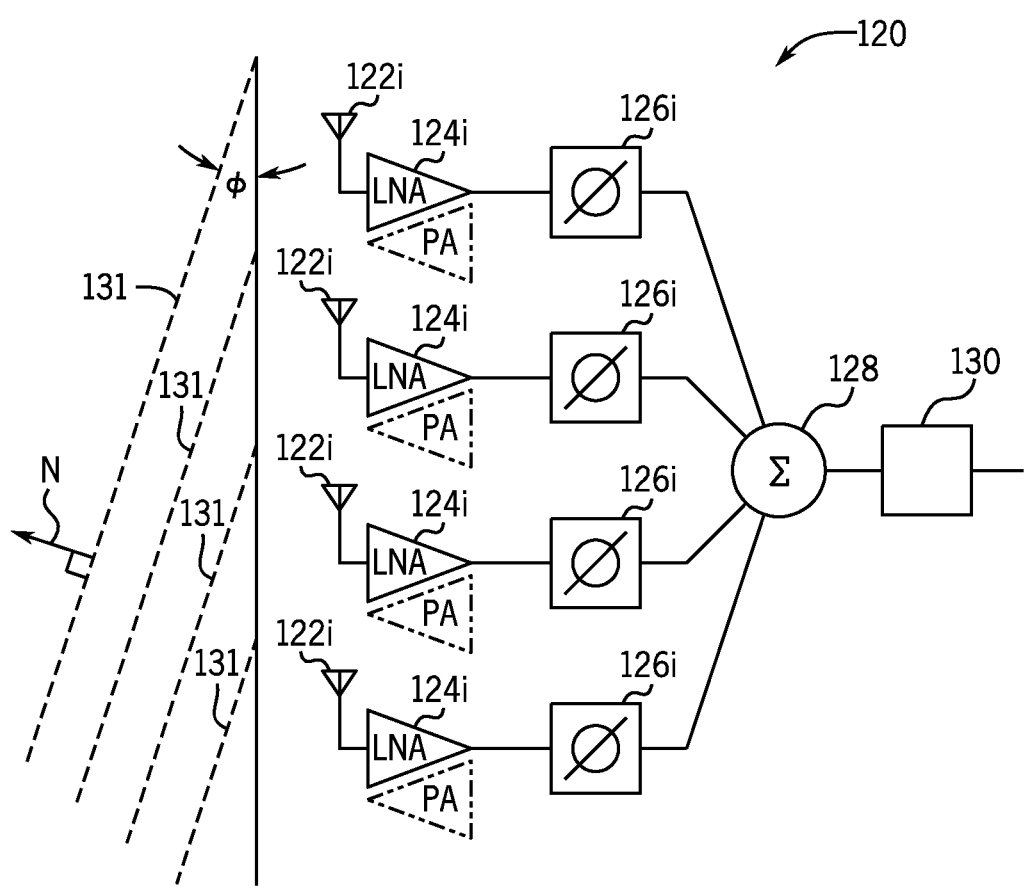
FIG. 7 is a schematic diagram illustrating an exemplary a phased array antenna in accordance with embodiments of the present disclosure.

FIG. 7 is a schematic illustration of a phased array antenna receiver (RX) system 120 in accordance with some embodiments of the present disclosure. The illustrated system includes multiple antenna elements 122$i$ configured for receiving a signal moving from left to right on the schematic. The incoming radio frequency (RF) signals (e.g., the wave fronts 132) can be detected by a set of individual antenna elements 122$i$ and amplified by a set of low noise amplifiers (LNAs) 124$i$. The wave fronts 132 may reach the antenna elements 122$i$ at different times. Therefore, the received signal will generally include phase offsets from one antenna element of the RX antenna to another. Thus, each phase shifter 126$i$ (e.g., a phase shifter chip) can be programmed to adjust the phase of the signal to the same reference, such that the phase offset among the individual antenna elements is canceled in order to combine the RF signals corresponding to the same wave front 132. FIG. 7 illustrates a signal combiner 128 that may combine the RF signals once the phase shifters 126$i$ phase-shift the RF signals. As a result of this constructive combining of signals, a higher signal to noise ratio (SNR) can be attained on the received signal, which results in increased channel capacity.

At a transmitting phased array antenna (moving from right to left in FIG. 7), the outgoing RF signals are routed from a modulator 130 via a distributor 128 to individual phase shifters 126i. Analogous to the receiving phased array antenna case, the RF signals are phase-offset by the phase shifters 126i by different phases, which vary by a predetermined amount from one phase shifter to another. A set of power amplifiers (illustrated in FIG. 7 with dashed lines) amplify the phase-offset RF signals, and the antenna elements 122i emit the RF signals as electromagnetic waves. (As seen in FIG. 8, described below, an exemplary phased array antenna radiation pattern is shown.)

Figure 8:
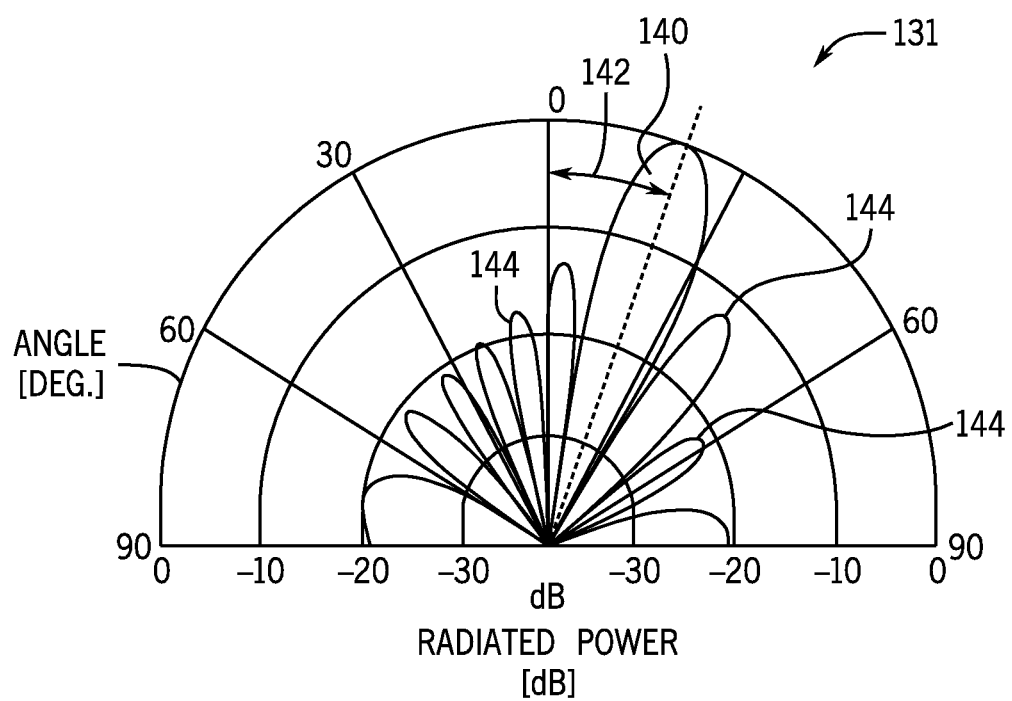
FIG. 8 is a graph of a main lobe and undesirable side lobes of an exemplary antenna signal from a phased array antenna.

FIG. 8 is a graph of main and side lobes of an antenna signal in accordance with embodiments of the present disclosure. The horizontal axis shows radiated power in dB. The radial axis shows angle of the RF field in degrees. The main lobe or main beam 140 represents the strongest RF field that is generated in a preferred direction by a phased array antenna. In the illustrated case, a desired pointing angle 142 of the main lobe 140 corresponds to about 20°. Typically, the main lobe 140 is accompanied by a number of side lobes 144 that are generally undesirable because the side lobes 144 derive their power from the same power budget, thereby reducing the available power for the main lobe 140. Furthermore, in some instances the side lobes 144 may reduce SNR at the receiving antenna.

2D Phased Array Antenna

A two-dimensional phased array antenna is capable of electronically steering in two directions. An exemplary phased array antenna may include a lattice of a plurality of antenna elements distributed in M columns oriented in a first direction and N rows extending in a second direction at an angle relative to the first direction (such as a 90 degree angle in a rectangular lattice or a 60 degree angle in a triangular lattice) configured to transmit and/or receive signals in a preferred direction.

Figure 9:
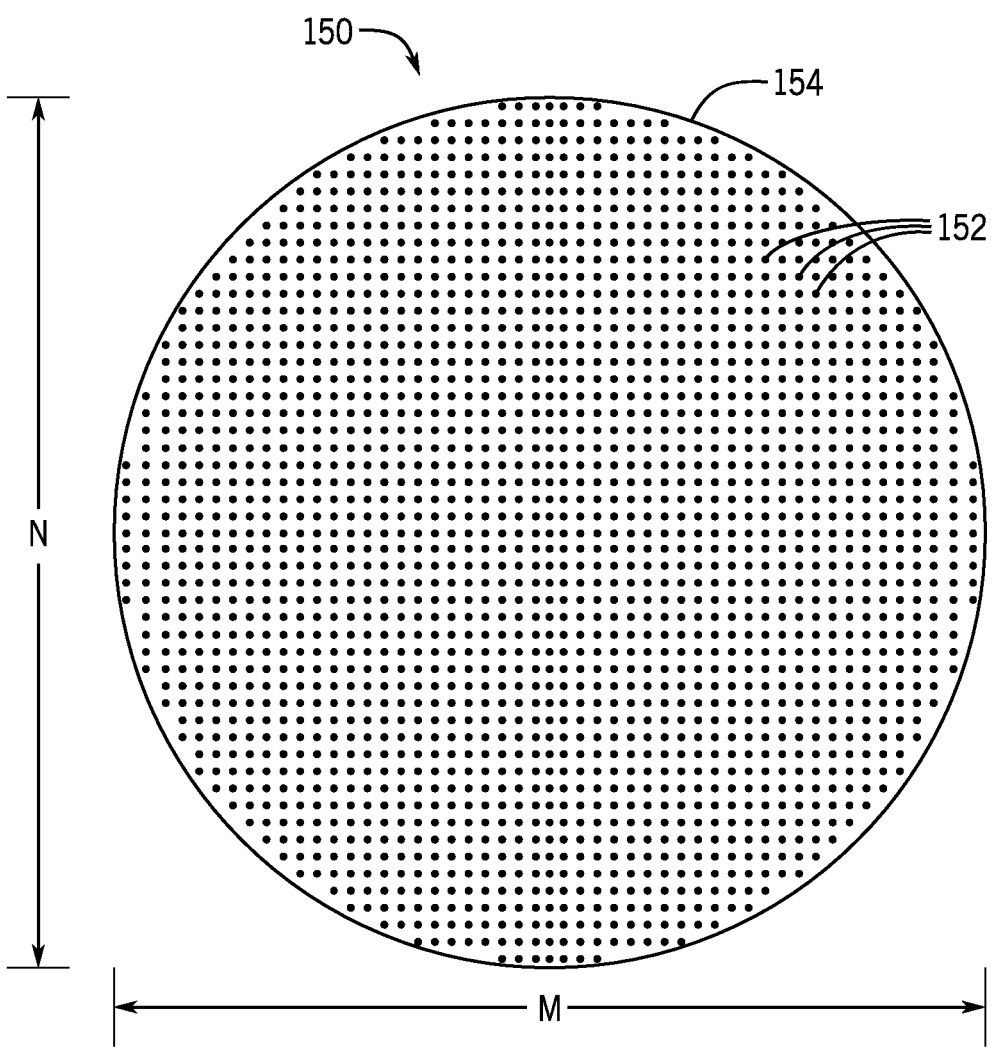
FIG. 9 is an exemplary schematic diagram illustrating a layout of plurality of individual antenna elements of a two-dimensional phased array antenna in accordance with embodiments of the present disclosure.

FIG. 9 shows a schematic layout or lattice 150 of individual antenna elements 152i of a two-dimensional phased array antenna. The illustrated phased array antenna layout 150 includes antenna elements 152i that are arranged in a 2D array of M columns by N rows. For example, the phased array antenna layout 150 has a generally circular or polygonal arrangement of the antenna elements 152i. In other embodiments, the phased array antenna may have another arrangement of antenna elements, for example, a square arrangement, rectangular arrangement, or other polygonal arrangement of the antenna elements. As described above, the antenna elements 152i are arranged in multiple rows and columns and can be phase offset such that the phased array antenna emits a waveform in a preferred direction. When the phase offsets to individual antenna elements are properly applied, the combined wave front has a desired pointing angle of the main lobe.

1D Phased Array Antenna

A one-dimensional phased array antenna is capable of electronically steering in one direction. An exemplary phased array antenna may include at least one row containing N antenna elements (such as 60, 80, or 100 elements) configured to transmit and/or receive signals in a preferred direction. The phased array antenna can include a single row with N antenna elements, or multiple rows with N antenna elements. The rows and the individual antenna elements within the rows may be spaced apart from each other by any suitable distance. If the phased array antenna includes multiple rows, each row may be oriented in the same (or a similar) direction.

Figure 10:
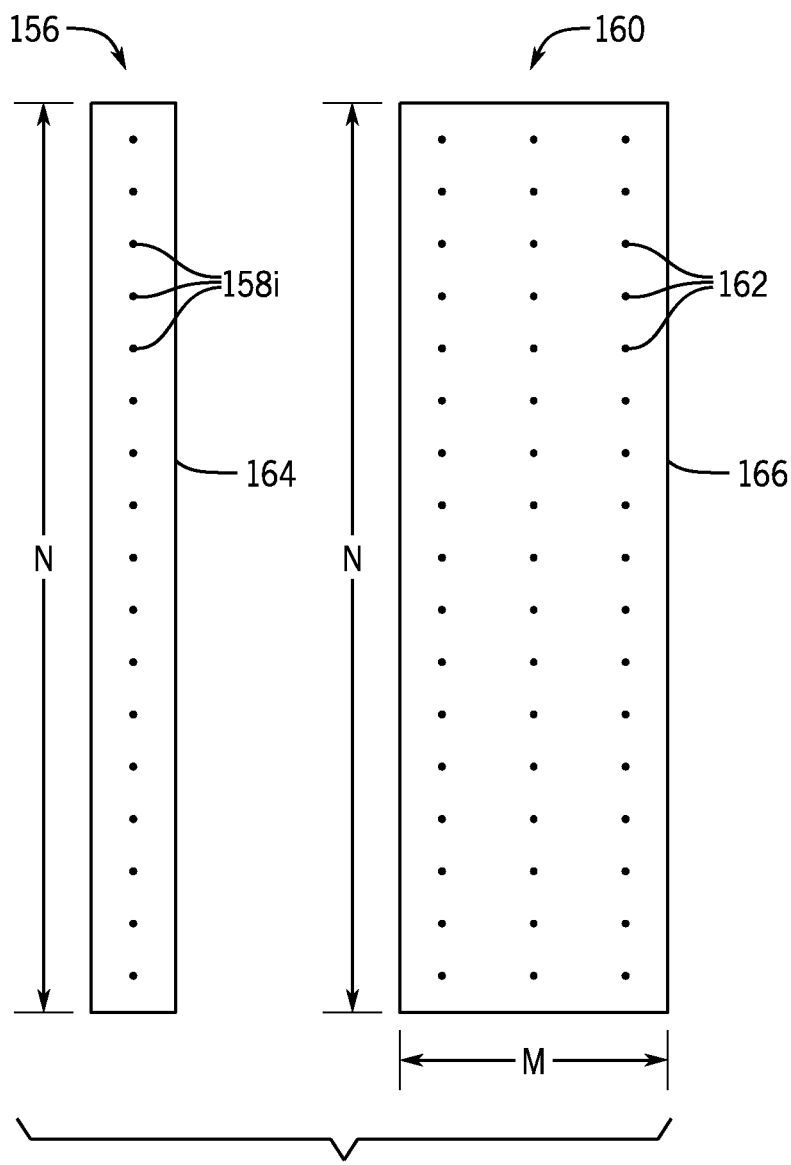
FIG. 10 is an exemplary schematic diagram illustrating a layout of plurality of individual antenna elements of a one-dimensional phased array antenna in accordance with embodiments of the present disclosure.

FIG. 10 shows a schematic layout 156 of individual antenna elements 158i of a one-dimensional phased array antenna 164. The illustrated phased array antenna layout 156 includes N antenna elements 158i that are arranged in a single row. FIG. 10 also shows a schematic layout 160 of individual antenna elements 162i of an additional one-dimensional phased array antenna 166. The illustrated phased array antenna layout 160 includes M rows that each include N antenna elements 162i. The antenna elements 158i and 162i can be phase offset such that the phased array antennas 164 and 166 emit waveforms in preferred directions. While the arrangement of antenna elements 162i within the schematic layout 160 may be similar to certain arrangements of two-dimensional phased array antennas (such as rectangular two-dimensional phased array antennas), the phased array antenna 166 may differ from these two-dimensional phased array antennas in that the antenna elements 162i are configured for steering only in a single direction, such as the N-direction.

While embodiments of the present disclosure may utilize either one-dimensional or two-dimensional phased array antennas, one-dimensional phased array antennas may have advantages in some cases. Because one-dimensional phased array antennas may generally include a smaller number of antenna elements and phase shifters than two-dimensional phased array antennas, one-dimensional phased array antennas may be less expensive and/or require less maintenance to install and operate. Thus, a satellite-based communication service may utilize one-dimensional phased array antennas in conjunction with the disclosed gimbaling techniques in order to obtain the two-dimensional steering capabilities of two-dimensional phased array antennas without requiring the number of antenna elements and phase shifters used in two-dimensional phased array antennas.

Field of Regard for a 1D Phased Array Antenna

Figure 11A:
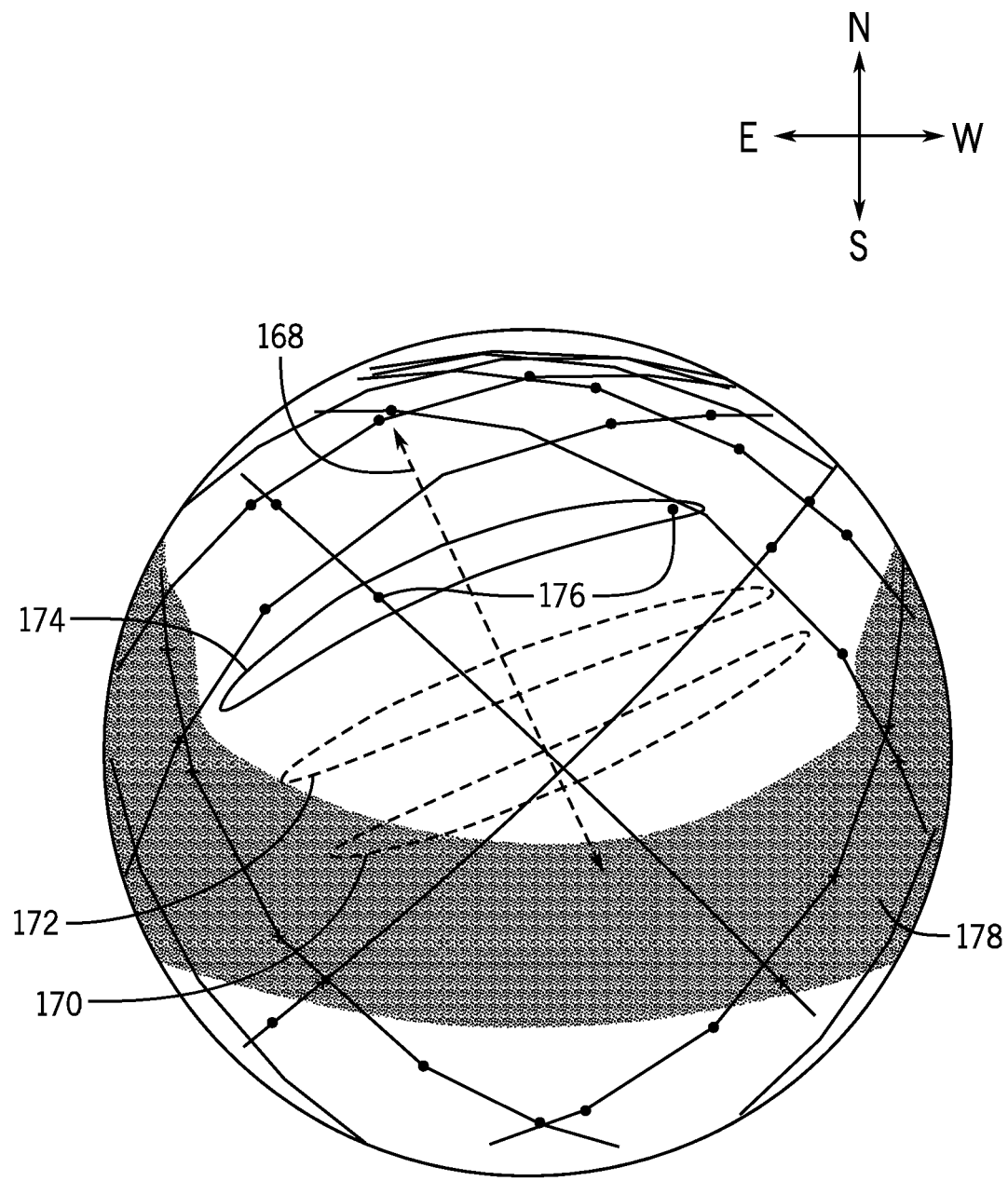
FIGS. 11A and 11B are exemplary schematic diagrams of sky views of a user or end point terminal showing satellites in a constellation and a GEO-belt of satellites.

Referring to FIG. 11A, an upward sky view is provided for an exemplary Earth-based user terminal in Los Angeles, Calif., United States. FIG. 11A illustrates a field of regard 174 in the sky for an antenna system of the user terminal that includes a one-dimensional phased array antenna. Because the user terminal is looking upward at the sky, East and West direction indicators are transposed. The upward sky view illustrated in FIG. 11A includes satellites within a satellite constellation (for example, one of the exemplary constellations of FIG. 6A, 6B, or 6C). The antenna system is capable of communicating with satellites visible or included within the field of regard 174 (such as satellites 176).

Referring to FIG. 1, an exemplary Earth-based user terminal 102 is shown installed at a house. In accordance with embodiments of the present disclosure, an Earth based user terminal may not necessarily be on the ground and may be a non-orbiting body positioned in the Earth's atmosphere, such as a mobile or non-mobile atmospheric platform. For example, an Earth-based user terminal may be in Earth's troposphere, such as within about 10 kilometers (about 6.2 miles) of the Earth's surface, and/or within the Earth's stratosphere, such as within about 50 kilometers (about 31 miles) of the Earth's surface, for example on a moving aircraft or a drone, or on a stationary (or approximately stationary) object, such as a balloon.

Fields of regard 170 and 172 represent additional exemplary positions of the field of regard 174 within the sky view shown in FIG. 11A. These positions may be obtained by the user terminal gimbaling the antenna system. For example, gimbaling the antenna system along a gimbaling axis may move the field of regard 174 along a corresponding gimbaling axis (such as a gimbaling axis 168 shown in FIG. 11A). The gimbaling axis 168 may correspond to the projection of the antenna system's gimbaling axis onto the sky. As will be explained in more detail below, moving a field of regard allows for tracking non-geosynchronous satellites as the satellites travel within their orbital planes, and as the orbital planes drift (e.g., precess).

In some cases, the field of regard 174 may be configured as an oblong shape that has one dimension being significantly longer than the other dimension. In embodiments of the instant disclosure that utilize one-dimensional phased array antennas capable of electronically steering in one direction, the steering direction may correspond to the longer dimension of the field of regard 174. As an illustrative example, the shape of the field of regard 174 shown in FIG. 11A is configured to be a rectangle with rounded corners. As shown, the shape of the field of regard 174 may appear to bend or be distorted due to the field of regard 174 being projected onto a three-dimensional space (the sky). The distortion or apparent shape of the field of regard 174 may vary based on the position of the field of regard 174 along the gimbaling axis 168 and/or based on the location of the user terminal. For instance, the apparent shape of the field of regard 174 changes as the antenna system is gimbaled (e.g., tilted away from an upward projection to the sky). Depending on the design and configuration of the phased array antenna and the antenna aperture in the user terminal, the field of regard may have other shapes (for example, an oval shape, a square shape, a polygonal shape, or another suitable shape).

Figure 11B:
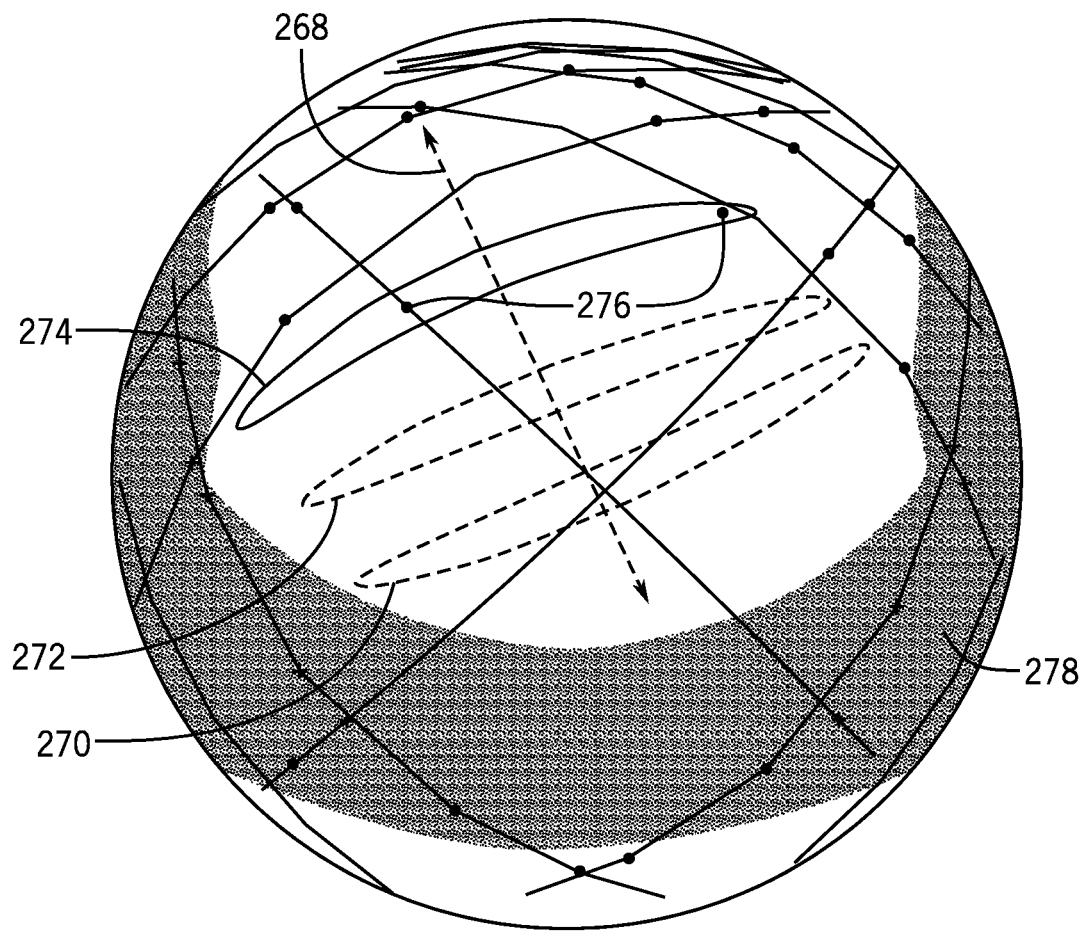

Referring to FIG. 11B, in another location using the same one-dimensional phased array antenna, an upward sky view is provided for an Earth-based user terminal in Los Angeles, Calif., United States, illustrating a similar field of regard 274. Satellites 276 of the satellite constellation are visible within the field of regard 274 and, therefore, are available for communication with the antenna system. Exemplary positions 270 and 272 of the field of regard 274 may be obtained by moving the field of regard 274 along a gimbaling axis 268 (which may be the same as or similar to the gimbaling axis 168 in FIG. 11A).

Design of the User Terminal

Figure 12B:
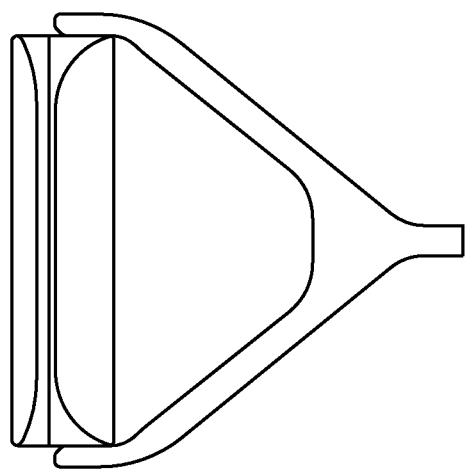
FIGS. 12A and 12B are front and side views of an exemplary user or end point terminal capable of gimbaling along at least one gimbaling axis.
Figure 12A:
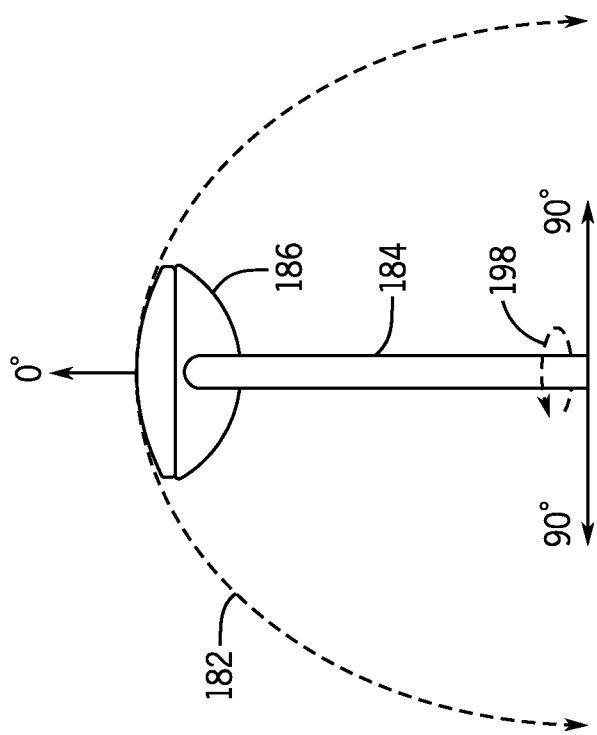

Referring now to FIGS. 12A and 12B, an exemplary user terminal 180 is designed and configured to allow for gimbaling of a phased array antenna system (such as an antenna system including the phased array antenna 164 or 166 illustrated in FIG. 10) along a gimbaling axis 182. FIG. 12A illustrates an exemplary, close-up side view of the user terminal 180 and FIG. 12B illustrates an example front view of the user terminal 180. Gimbaling the antenna system along the gimbaling axis 182 may move the field of regard of the phased array antenna of the user terminal 180 along a corresponding gimbaling axis (for example, the gimbaling axis 168 or 268 illustrated in FIGS. 11A and 11B). To enable the antenna system to gimbal along the gimbaling axis 182, one end of a mount 184 of the user terminal 180 may be stationary with respect to the gimbaling axis 182 (for example, the end of the mount 184 may be secured to a building, the ground, an automobile, a boat, an airplane, a balloon, etc.). The mount 184 may include or be coupled to a gimbaling mechanism that pivots the mount 184 such that an antenna housing 186 (which houses the phased array antenna) gimbals along the gimbaling axis 182. In some cases, the gimbaling axis 182 may correspond to an altitudinal axis. FIG. 12A shows the antenna housing 186 at 0 degrees along the gimbaling axis 182 (for example, a vertical position). The gimbaling mechanism may gimbal the antenna housing 186 up to 90 degrees in either direction along the gimbaling axis 182 (for example, in a forward direction and a backward direction).

In an illustrative example, the position of the field of regard 172 or 272 in FIG. 11A or 11B corresponds to the field of regard of the phased array antenna when the antenna housing 186 is in the vertical position shown in FIG. 12A. In addition, the field of regard 170 or 270 in FIG. 11A or 11B may correspond to gimbaling the antenna housing 186 approximately 45 degrees along the gimbaling axis 182 in the forward direction, and the field of regard 174 or 274 in FIG. 11A or 11B may correspond to gimbaling the antenna housing 186 approximately 45 degrees along the gimbaling axis 182 in the backward direction. The user terminal 180 may be configured to gimbal along any number of gimbaling axes, such as 2 gimbaling axes or 3 gimbaling axes. For instance, the user terminal 180 may include a second gimbaling mechanism that enables the antenna housing 186 to gimbal along a gimbaling axis 198 illustrated in FIG. 12A. Gimbaling axis 198 may correspond to an azimuthal axis.

The antenna housing 186 may define or control the shape of the field of regard of the phased array antenna. For instance, the length and width of the aperture of the antenna housing 186 may correspond to the length and width, respectively, of the field of regard. If the field of regard is rectangular (or approximately rectangular), the longer dimension may be defined as the length and the shorter dimension may be defined as the width. In an illustrative example, an antenna housing 186 configured to house the phased array antenna 166 (shown in FIG. 10) may be sized to accommodate the multiple rows of antenna elements 162$i$ within the phased array antenna 166. For instance, the width of the aperture of the antenna housing 186 may be adjusted based on the number of rows of the antenna elements 162$i$. The number of rows of the antenna elements 162$i$ may be selected to produce a desired width of the field of regard of the phased array antenna 166 (for example, a greater number of rows may produce a smaller width of the field of regard).

In some cases, the antenna housing 186 may include one or more additional components that help define or control the shape of the field of regard. For instance, the antenna housing 186 may include or be composed of a parabolic trough that reflects signals transmitted by the phased array antenna. In some examples, the parabolic trough may be designed to increase or decrease the width of the field of regard (e.g., by a predetermined amount). Thus, the parabolic trough may be implemented in phased array antenna systems that include a single row (or a small number of rows) of antenna elements. In an illustrative example, an antenna housing 186 configured to house the phased array antenna 164 (shown in FIG. 10) may include a parabolic trough that reflects signals transmitted by the single row of antenna elements 158$i$ within the phased array antenna 164. In other examples, the antenna housing 186 may include a lens whose shape and/or curvature corresponds to the shape of the field of regard. The size or shape of the antenna housing 186 (as well as the number of antenna elements included within the antenna housing 186) may be selected to produce any suitable size or shape of the field of regard.

Geobelt

Referring again to FIGS. 11A and 11B, the shaded areas 178 and 278 in the sky views illustrate the GEO-belt of satellites in geosynchronous equatorial orbit (GEO). See also FIG. 13 for an illustration of a GEO-belt of satellites 188. A GEO orbit is a circular orbit 35,786 km (22,236 mi) above Earth's equator and following the direction of Earth's rotation. An object in GEO orbit has an orbital period equal to the Earth's rotational period. Therefore, to ground observers, the satellite appears motionless at a fixed position in the sky.

Many satellites co-exist in the GEO-belt. For example, communications satellites are often placed in a GEO orbit so that Earth based satellite antennas can be pointed permanently at the position in the sky where the satellites are located and do not need to be rotated for tracking. Further, weather satellites in GEO orbit for real time monitoring and data collection, and navigation satellites in GEO orbit to provide a known calibration point to enhance GPS accuracy.

Within the GEO-belt, weather or Earth observation satellites might not interfere with GEO-belt communication satellites. However, broadcast or communication satellites are typically spaced to avoid frequency interference or overlap. In addition to proper spacing between satellites within the GEO-belt, communication satellites in other orbits, such as LEO and MEO orbits, can be designed and configured to avoid interference with already existing GEO communication satellites.

Figure 13:
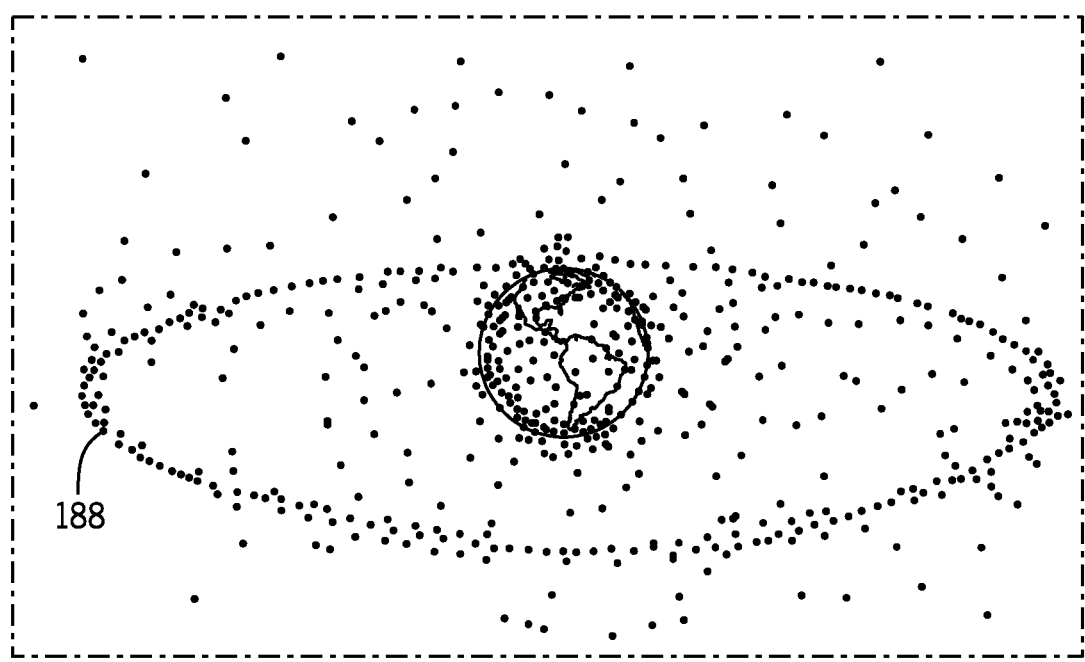
FIG. 13 is a not-to-scale exemplary schematic diagram illustrating the GEO-belt of geostationary satellites orbiting the equator with an orbital period of exactly one day (flying at an altitude of approximately 35,786 km above mean sea level)

Referring to FIG. 13, a not-to-scale simplified illustration of Earth and its satellites is provided, which shows the line formed by the GEO-belt of satellites 188. Returning to FIGS. 11A and 11B, the respective shaded areas 178 and 278 show what the potential interference zone for the GEO-belt of satellites 188 in geosynchronous equatorial orbit (GEO) look like in relation to the fields of regard (e.g., 170 in FIG. 11A and 270 in FIG. 11B) of a user terminal having a one-dimensional phased array antenna.

Although the GEO-belt of satellites 188 seen in FIG. 13 is generally comprised of a band of satellites located in space at a certain altitude above Earth's equator and following the direction of Earth's rotation, the GEO-belt interference zones 178 and 278 are a larger range of communication interference based on the performance of an antenna system to avoid interference with the GEO belt of satellites 188. For example, in accordance with embodiments of the present application, the GEO-belt interference zones 170 and 270 may be in a range of +/−5 to 30 degrees of the GEO-belt of satellites 188.

In the illustrated embodiment of the present application, the GEO-belt interference zone 178 or 278 is defined as +/−18 degrees of the GEO-belt of satellites 188. Therefore, the shaded areas 178 and 278 representing the GEO-belt interference zones 178 and 280 in FIGS. 11A and 11B are sized to represent the communication interference zone of +/−18 degrees of the GEO-belt of satellites 188. Depending on the latitude of the user terminal, the view of the GEO belt of satellites 188 with respect to the fields of regard 160 and 260 may change. For example, FIG. 11A illustrates a sky view for a user terminal in Los Angeles, Calif., at a latitude of 34.0522° N (see a location L1 in FIG. 5). In contrast, FIG. 11B illustrates a sky view for a user terminal in Seattle, Wash., at a latitude of 47.6062° N (see a location L2 in FIG. 5). As seen in the illustrated examples of FIGS. 11A and 11B, the GEO-belt interference zone 178 or 278 is more centered in the sky view of user terminals positioned closer to the equator. Because Los Angeles (location L1 in FIG. 5) is closer to the equator than Seattle (location L2 in FIG. 5), the overlap between the GEO-belt interference zone 178 and the field of regard 170 (shown in FIG. 11A) is greater than the overlap between the GEO-belt interference zone 278 and the field of regard 270 (shown in FIG. 11B). Embodiments of the present disclosure may account for these varying overlaps when determining GEO-belt interference zones for phased array antennas implemented at different latitudes. For example, the initial orientation of the user terminal and/or the gimbaling range of the user terminal may be adjusted based on the latitude of the user terminal.

As discussed above, the phased array antennas of the present embodiment are configured to communicate with satellites in non-geosynchronous orbits, which move relative to Earth-based locations. Specifically, a non-geosynchronous satellite travels within its orbital path at an orbital velocity that does not correspond to the Earth's rate of rotation. In addition, the non-geosynchronous satellite drifts Westward as its orbital path drifts (e.g., precesses) along the rotational axis of the Earth.

To facilitate continuous communication between a user terminal and satellites in non-geosynchronous orbits, a phased array antenna system can track movement of the satellites. The ability of a phased array antenna system to track a satellite may be limited by factors such as the GEO-belt interference zone, the field of regard of the phased array antenna system, and threshold communication latencies, among others. The antenna systems of the present disclosure account for these limitations by tracking satellites as the satellites travel within their orbital planes (which may be referred to as intraplane tracking), switching communication to different satellites within the same orbital plane (which may be referred to as intraplane switching), and switching communication from a satellite in one orbital plane to a satellite in a different orbital plane (which may be referred to as interplane switching). As will be explained below in connection with FIGS. 14-25, intraplane tracking, intraplane switching, and interplane switching may be accomplished via a combination of electronic steering of a phased array antenna and moving the field of regard of the phased array antenna.

Intraplane Tracking and Switching

Figure 14:
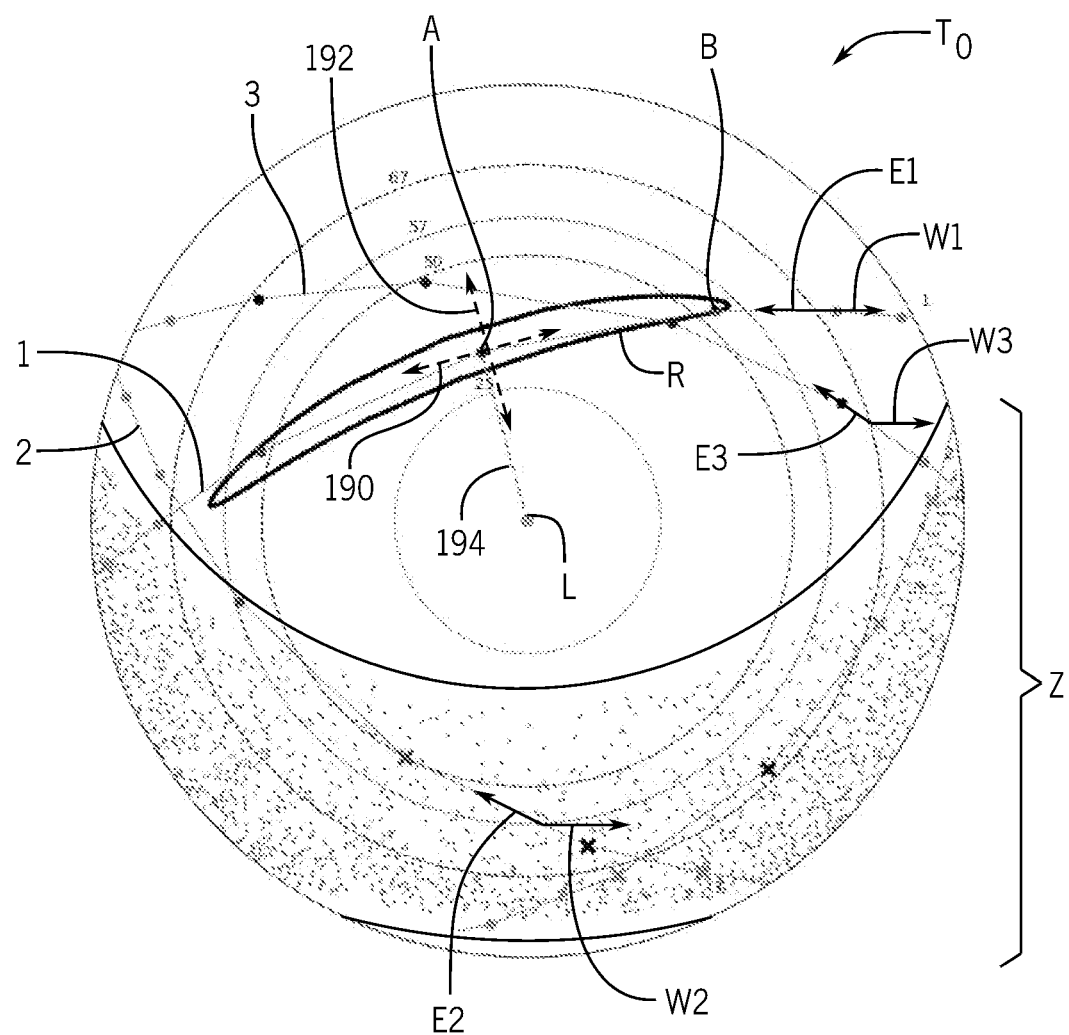
FIGS. 14, 15, 16, 17, 18, 19, 20, 21, 22, 23, 24, and 25 are exemplary schematic illustrations of the field of regard of a one-dimensional phased array antenna and satellites visible within the field of a regard as the field of regard moves along a gimbaling axis.

FIG. 14 illustrates a plurality of satellites within a satellite constellation. The satellite constellation includes non-geosynchronous orbital planes 1, 2, and 3 (which may correspond to orbital planes of the exemplary constellations of FIG. 6A, 6B, or 6C). Orbital planes 1, 2, and 3 may have different inclinations (e.g., the orbital planes may each be part of a different satellite set, such as satellite set X or Y shown in FIG. 5), or two or more of orbital planes 1, 2, and 3 may have the same inclination (e.g., the orbital planes may correspond to different segments or portions of the same satellite set). In the examples of FIGS. 14-25, the satellites of orbital planes 1, 2 and 3 travel in a generally Eastward direction (as indicated by arrows E1, E2, and E3 in FIG. 14). Each orbital plane also drifts in a generally Westward direction (as indicated by arrows W1, W2, and W3 in FIG. 14). The satellite constellation may include one or more additional satellites or orbital planes not illustrated in FIG. 14, such as a sufficient number of satellites and/or orbital planes to facilitate continuous or near-continuous communication with one or more user terminals. For instance, the satellite constellation may include thousands of satellites distributed in dozens of orbital planes. In an illustrative example, the satellite constellation may include 100 orbital planes that each include 50-70 satellites.

In the example of FIG. 14, a user terminal including an antenna system is positioned at an Earth-based location L. The antenna system includes a one-dimensional phased array antenna that defines a limited field of regard R. The one-dimensional phased array antenna is capable of steering in first and second steering directions along a longitudinal steering axis 190 within the field of regard R. In some cases, the steering axis 190 may be substantially parallel to orbital plane 1. In addition, the antenna system is secured to Earth-based location L (see also FIG. 1) via a mount that is capable of gimbaling the antenna system to produce movement of the field of regard R along a gimbaling axis 192. In one illustrative example, the steering axis 190 is substantially orthogonal to the gimbaling axis 192.

FIG. 14 illustrates the field of regard R at a time $T_0$. At time $T_0$ the field of regard R facilitates communication between the antenna system and satellites A and B of orbital plane 1 (e.g., based on satellites A and B being visible within the field of regard R). As shown in FIG. 14, at time $T_0$ the antenna system is in communication with satellite A. This communication is illustrated by a dashed communication line 194 (also shown in FIG. 1), which represents the communication vector between the user terminal and satellite A. As shown in FIG. 1, the communication vector may be oriented in a direction in which the beam of the user terminal is being steered from a boresight vector of the user terminal along a zenith axis 134 of the user terminal (e.g., via a combination of gimbaling the antenna system and electronically steering the beam of the antenna system). The communication vector may include components corresponding to the altitude of satellite A and a lateral distance 136 between the user terminal and the satellite A. A satellite with a nadir axis aligned with the zenith axis of the user terminal will have zero lateral distance, and no communication vector will be shown.

As satellite A moves from West to East, the antenna system tracks satellite A in order to maintain communication with satellite A. Specifically, as satellite A travels within orbital plane 1, the antenna system may electronically steer the beam of the one-dimensional phased array antenna in an Eastward direction along the steering axis 190 to follow the Eastward movement of satellite A. If the steering axis 190 is substantially aligned with orbital plane 1, the antenna system may electronically steer the beam at a rate that is substantially the same as a rate at which satellite A travels within orbital plane 1 (e.g., the orbital velocity of satellite A). In addition, the antenna system may move the field of regard R to track the drift (e.g., the Westward precession) of orbital plane 1. If the axis of precession of orbital plane 1 is substantially the same as the gimbaling axis 192, the antenna system may move the field of regard R at a rate that is substantially the same as the drift rate of orbital plane 1. In some cases, electronically steering the beam and moving the field of regard R may be performed simultaneously. Tracking satellite A via a combination of electronic steering and/or gimbaling may represent and/or include an example of intraplane tracking.

Thus, although the antenna system may be configured for electronically steering in a single direction, the gimbaling mechanism of the antenna system enables the beam of the one-dimensional phased array antenna to be steered in two directions in order to track the movement of satellites in two dimensions. For instance, the antenna system steers the beam in one direction via an electrical beam-steering mechanism and steers the beam in an additional direction via a mechanical gimbaling mechanism.

Figure 15:
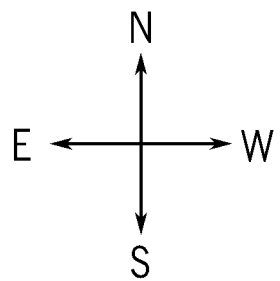
Figure 15:
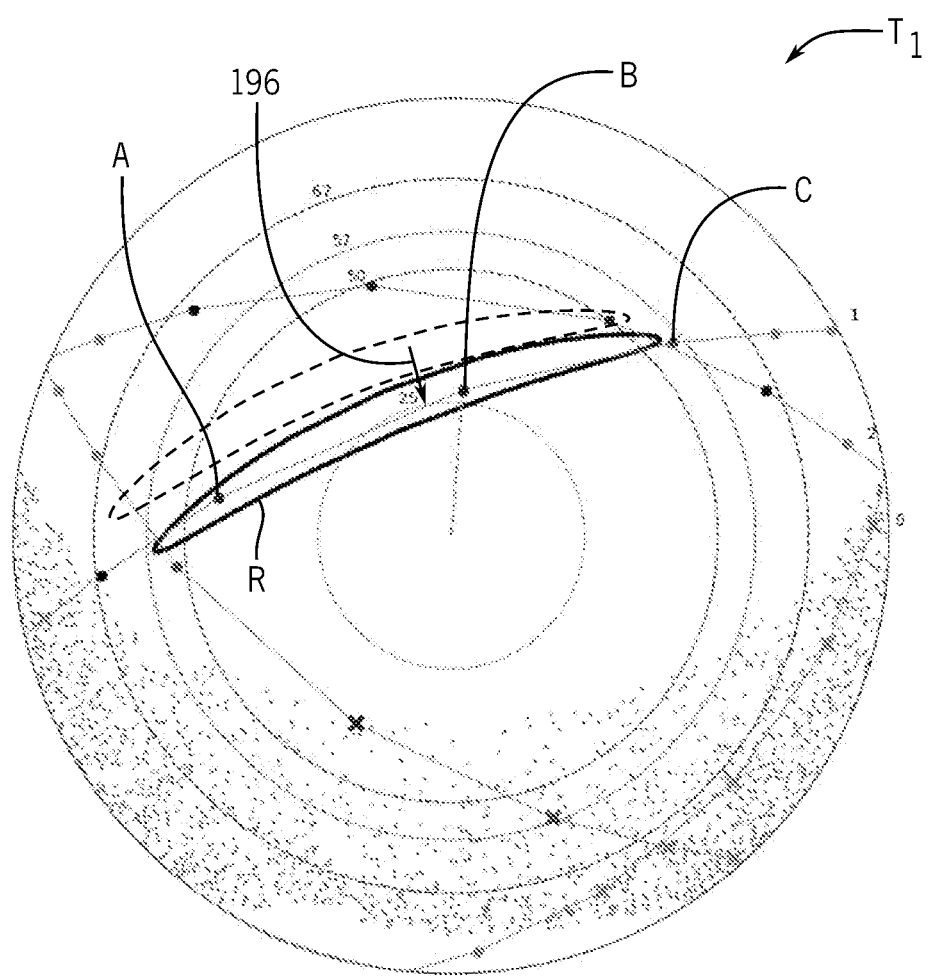

FIG. 15 illustrates how the positions of satellites A and B have changed (e.g., moved in an Eastern direction) within the field of regard R from time $T_0$ to a time $T_1$. In addition, an arrow 196 in FIG. 15 illustrates how the antenna system moves the field of regard R along the gimbaling axis 192 (shown in FIG. 14) from time $T_0$ to time $T_1$ in order to track the drift of orbital plane 1.

At time $T_1$, the antenna system may establish communication with satellite B. Establishing communication with satellite B may represent and/or include an example of intraplane switching. Time $T_1$ may be determined (e.g., relative to time $T_0$) based on various factors and/or criteria. In one illustrative example, the antenna system may switch to satellite B once satellite A is close to being no longer visible within the field of regard R (e.g., when satellite A is approaching the Eastern boundary of the field of regard R). In another example, the antenna system may switch to satellite B once satellite B is closer in distance to the Earth-based location L of the antenna system than satellite A, which may facilitate maintaining minimum communication latency with satellites of orbital plane 1. In an additional example, the antenna system may switch to satellite B for load balancing purposes. For instance, the antenna system may switch to satellite B in response to the communication load of satellite A exceeding a threshold load and/or exceeding the communication load of satellite B. In a further example, the antenna system may switch to satellite B due to a physical obstacle (such as a building or geological feature) preventing communication with satellite A.

Figure 16:
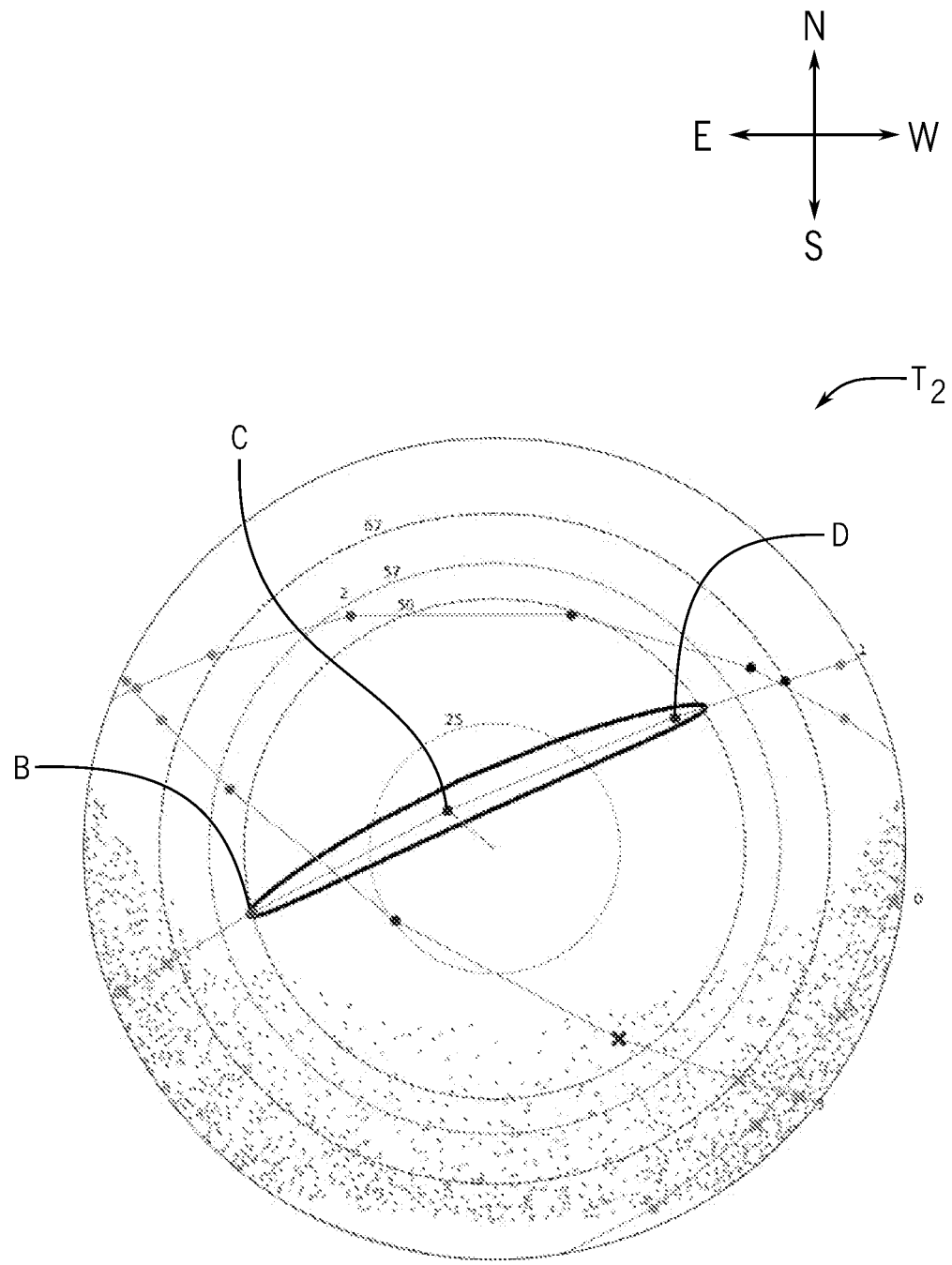
Figure 17:
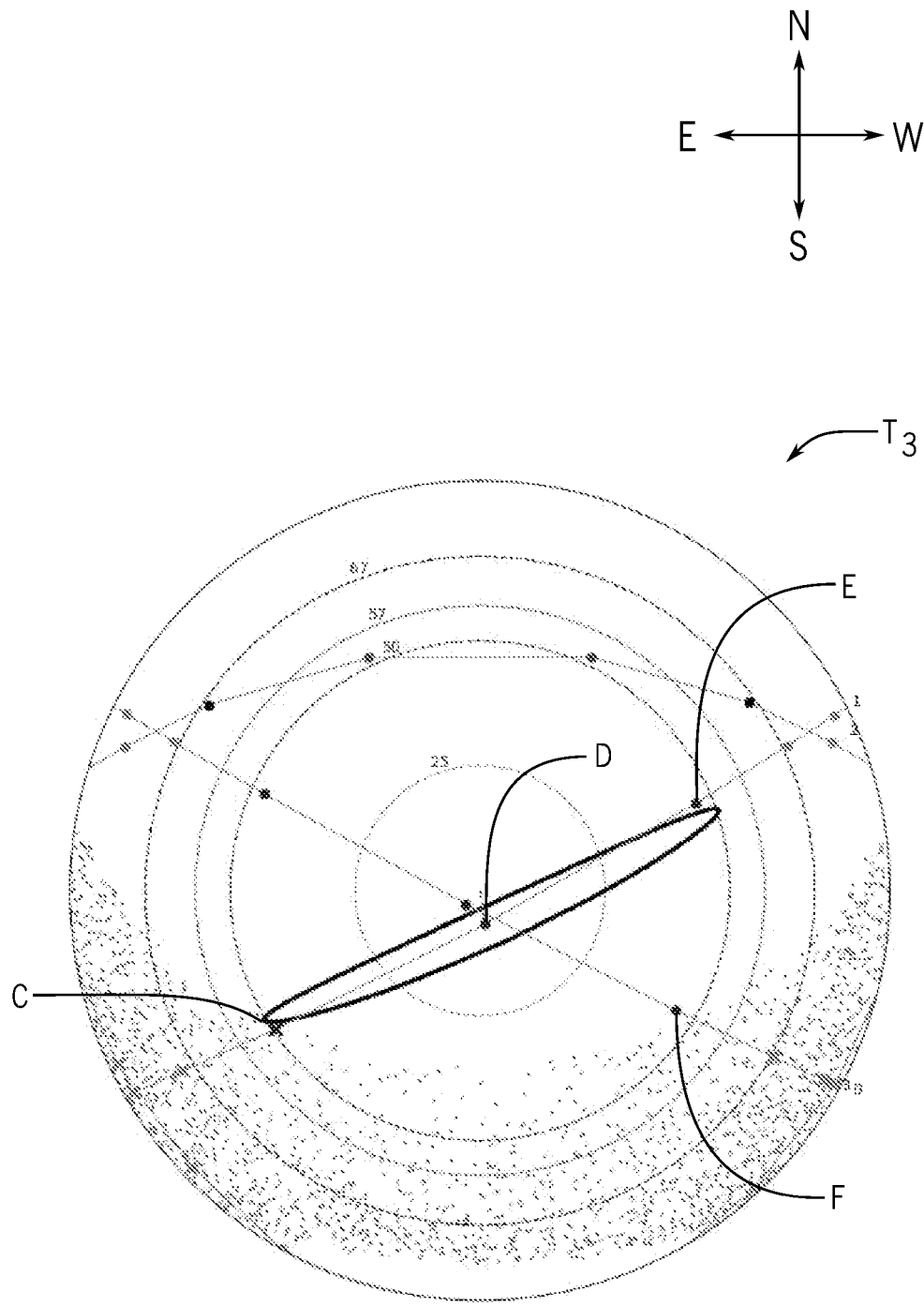

After the antenna system establishes communication with satellite B, the antenna system continues to track satellite B (for example, via a combination of electronically steering the one-dimensional phased array antenna and moving the field of regard R). The antenna system may continue to track one or more additional satellites of orbital plane 1 in this manner. For instance, the antenna system may iteratively establish communication with (and then track) subsequent satellites of orbital plane 1 as the satellites become visible within the field of regard R. To further illustrate this process of interplane tracking and switching, FIG. 16 shows the field of regard R at a time $T_2$ when the antenna system has established communication with a satellite C of orbital plane 1 and satellite B is approaching the Eastern boundary of the field of regard R. FIG. 17 illustrates the field of regard R at a time $T_3$ when the antenna system has established communication with a satellite D of orbital plane 1 and satellite C has traveled beyond the Eastern boundary of the field of regard R. Further, FIG. 18 illustrates the field of regard R at a time $T_4$ when the antenna system has established communication with a satellite E of orbital plane 1 and satellite D has traveled beyond its eastern boundary.

First Interplane Switching

FIGS. 14-18 illustrate the field of regard R moving along the gimbaling axis 192 in a first gimbaling direction (which may correspond to the forward direction discussed in connection with FIG. 12A). The antenna system may continue to move the field of regard R in the first direction until the field of regard R reaches a certain position along the gimbaling axis 192. At this position, the field of regard R includes an intersection between orbital plane 1 and an additional orbital plane. After this position is reached, the antenna system may switch to communicating with (and then tracking) a satellite from the additional orbital plane. Thus, this position may be referred to as a switching position, and the communication switch may be referred to as interplane switching (or hand-off).

Figure 18:
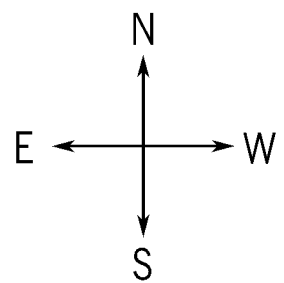
Figure 18:
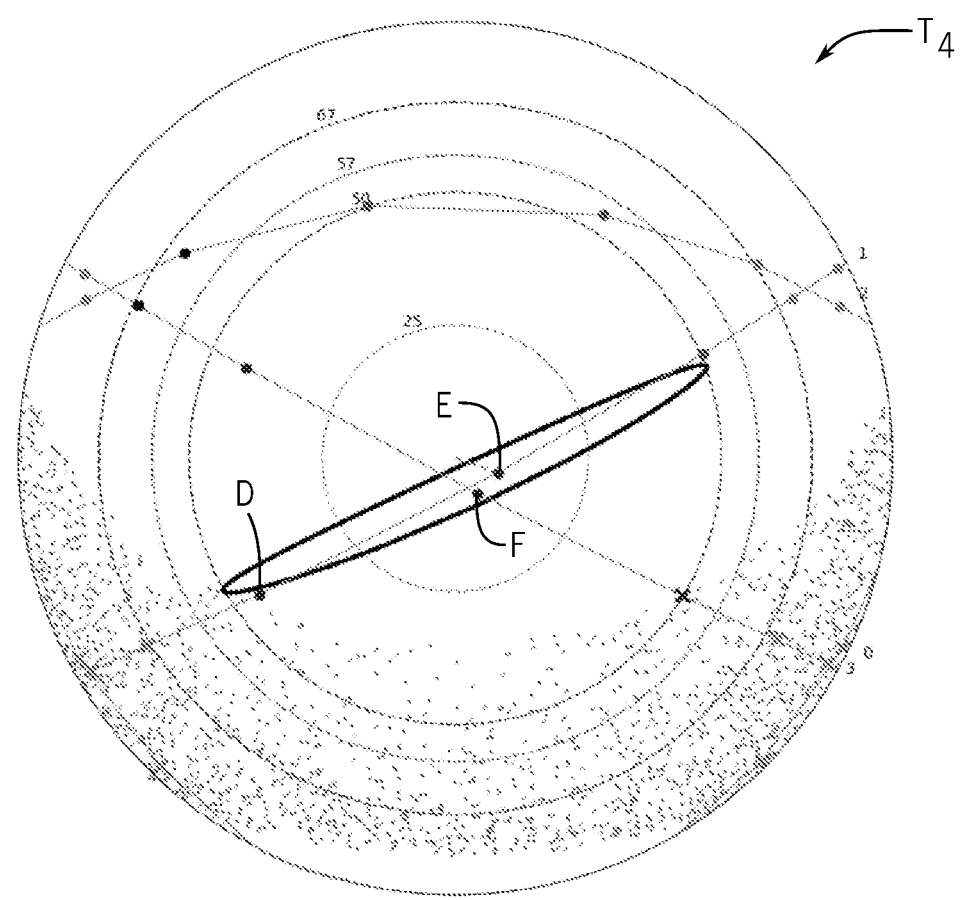
Figure 19:
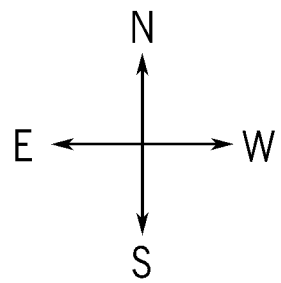
Figure 19:
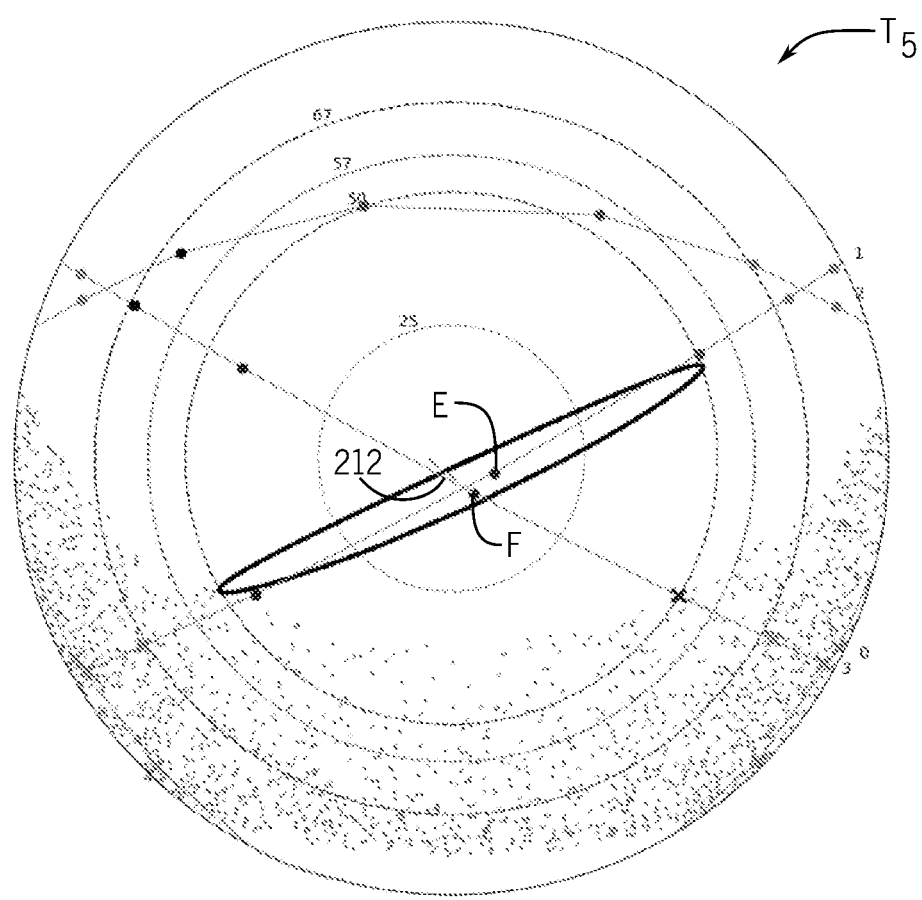

The position of the field of regard R illustrated in FIG. 18 may correspond to a switching position. In this position, the antenna system is capable of communicating with both satellite E of orbital plane 1 and a satellite F of orbital plane 2. At time $T_4$ shown in FIG. 18, the antenna system is in communication with satellite E. At a time $T_5$ shown in FIG. 19, the antenna system switches to communicating with satellite F, as shown by a dashed communication line 212 (representing an example of interplane switching). The position of the field of regard R in FIG. 18 may be essentially the same as the position of the field of regard R in FIG. 19, and time $T_5$ may be essentially the same as (e.g., immediately following) time $T_4$.

The switching position may be selected or determined based on a variety of factors. In some cases, the switching position may be based at least in part on a GEO-belt of satellites Z (illustrated in FIG. 14). To avoid interference with the GEO-belt of satellites Z, the antenna system may stop gimbaling the field of regard R in the first direction before the field of regard R overlaps with a GEO-belt interference zone (for example, a zone of +/−18 degrees of the GEO-belt zone of satellites Z). Further, the switching position may be determined to facilitate load-balancing within the satellite constellation. For instance, the switching position may be selected such that the field of regard at the switching position facilitates communication with a satellite that has available bandwidth for providing communication services (instead of a satellite that has no or less available bandwidth). In addition, the switching position may be determined based at least in part on a maximum degree of gimbaling of the antenna system. For instance, as illustrated by the dashed communication lines in FIGS. 14-25, as the field of regard R is moved in accordance with the user terminal gimbaling away from a vertical orientation, the distance between the antenna system and the satellites visible in the field of regard R increases. This increasing distance results in a corresponding increase in communication latencies. Thus, the antenna system may stop gimbaling the field of regard R before the communication latency exceeds a threshold latency. In further examples, the switching position may be selected based at least in part on mechanical limitations that limit the degree to which the antenna system can be gimbaled along a gimbaling axis. The switching position may be determined based on any combination of the above factors, as well as any additional factor.

In some cases, the antenna system may be capable of performing an interplane switch with multiple orbital planes. For instance, the satellite constellation may include more than one orbital plane that intersects orbital plane 1 while the field of regard R moves along the gimbaling axis 192 from the initial position illustrated in FIG. 14 towards the GEO-belt of satellites Z. FIG. 6B illustrates an example of multiple intersecting planes. Specifically, FIG. 6B illustrates an orbital plane X1 of a first satellite set at a first inclination and orbital planes Y1 and Y2 of a second satellite set at a second inclination. In an exemplary embodiment, the first and second satellite sets may correspond, respectively, to satellite sets X and Y shown in FIG. 5. Returning to FIG. 6B, orbital planes Y1 and Y2 may represent adjacent orbital planes within the second satellite set. In some cases, satellites within adjacent orbital planes may have RAANs that are offset by a certain amount (such as 5 degrees, 10 degrees, or 20 degrees). For instance, a satellite set may include multiple orbital planes that "loop" around the Earth at predetermined RAAN offsets. While the RAANs of individual satellites within the orbital planes may change as the orbital planes drift Westward, the RAAN offsets between the orbital planes may remain constant (or approximately constant).

In an illustrative example, the antenna system may be in communication with satellites of orbital plane X1. As the antenna system moves the field of regard R to track the Westward drift of orbital plane X1, a first position of the field of regard R may include an intersection between orbital plane X1 and orbital plane Y1, and a second (e.g., later) position of the field of regard R may include an intersection between orbital plane X1 and orbital plane Y2. Both of these positions may represent potential switching positions. The antenna system may determine a suitable or optimal switching position from the potential switching positions. For example, the antenna system may select between orbital planes Y1 and Y2 based on current communication loads of satellites within orbital planes Y1 and Y2. In other examples, the antenna system may switch to an additional orbital plane of the second satellite set (such as an orbital plane Y3 shown in FIG. 6B), an orbital plane of the first satellite set (such as an orbital plane X2 shown in FIG. 6B), or an orbital plane of a satellite set with an inclination not illustrated in FIG. 6B.

Single-Satellite Tracking

Figure 20:
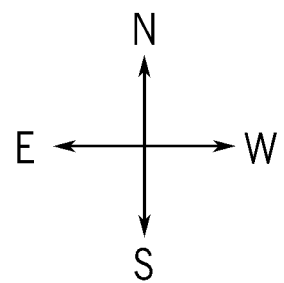
Figure 20:
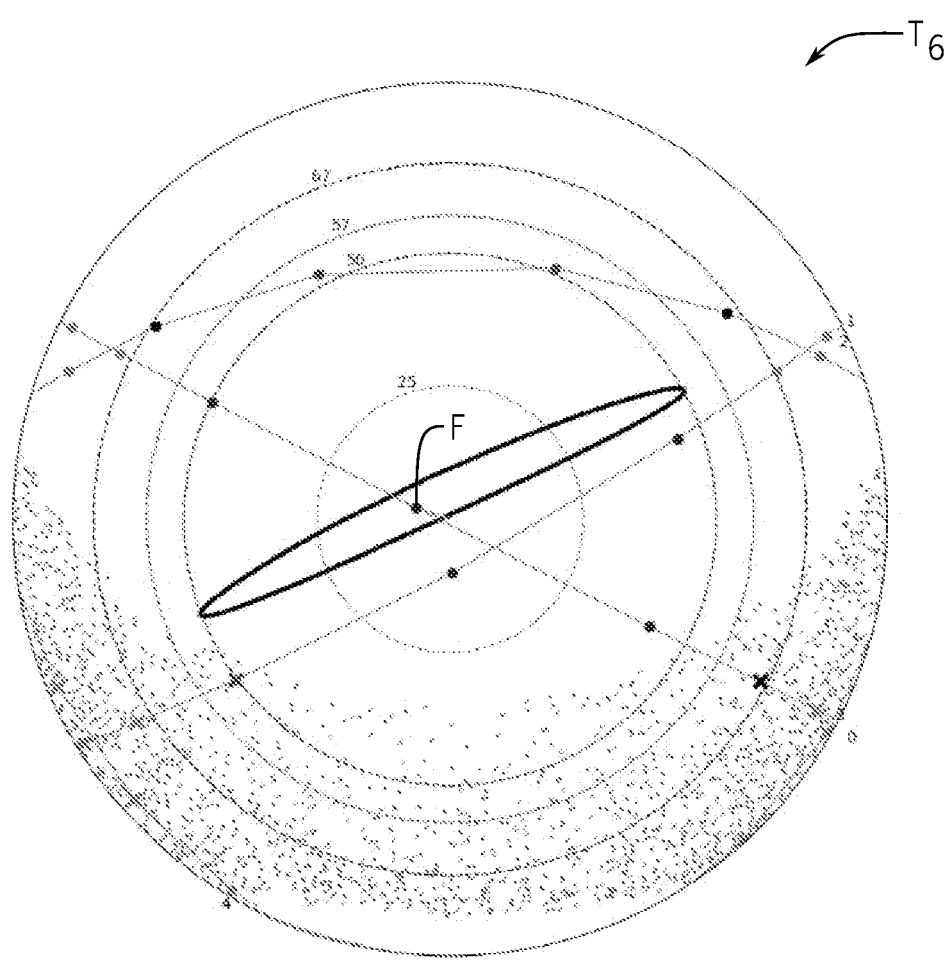
Figure 21:
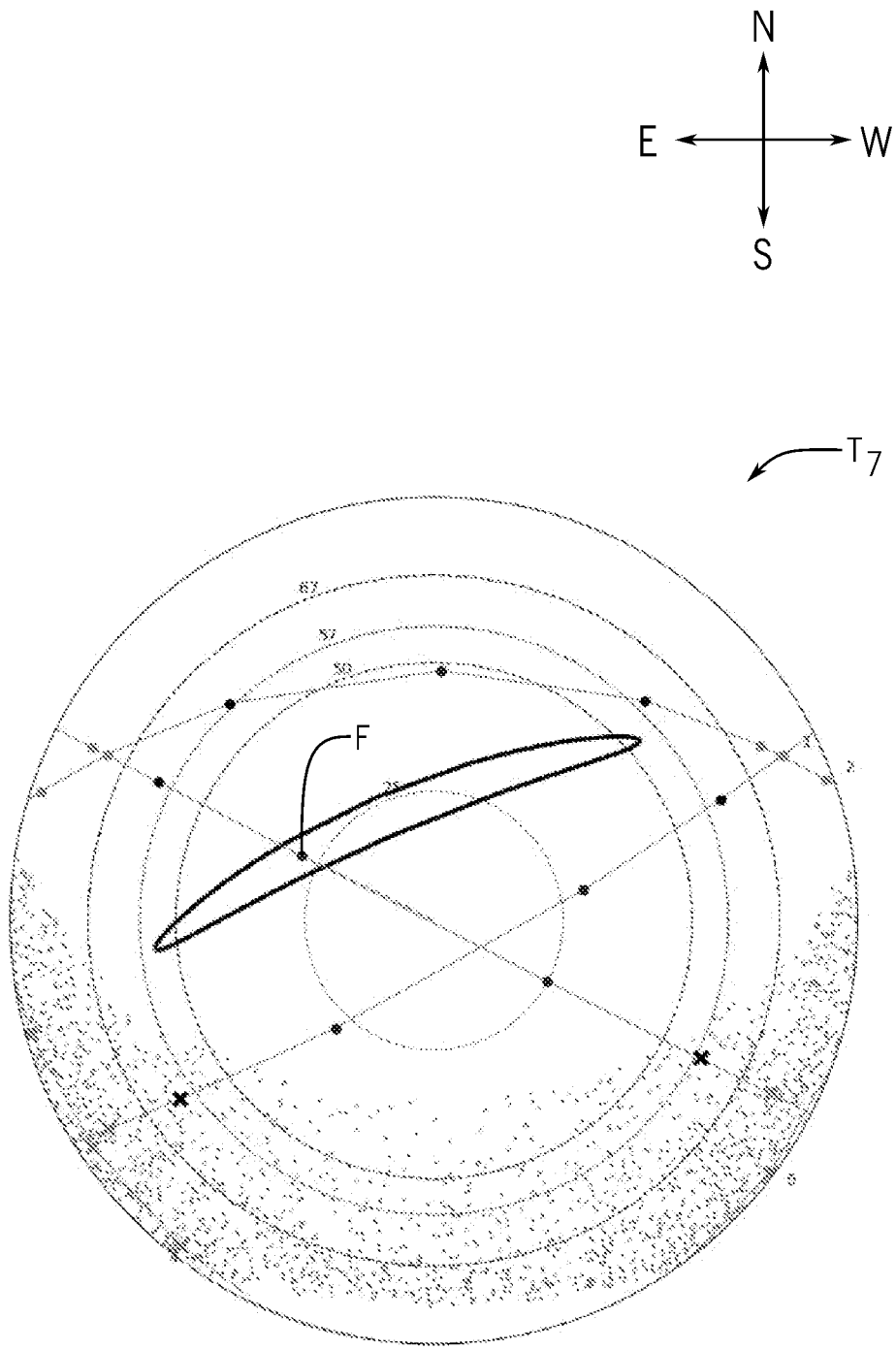
Figure 22:
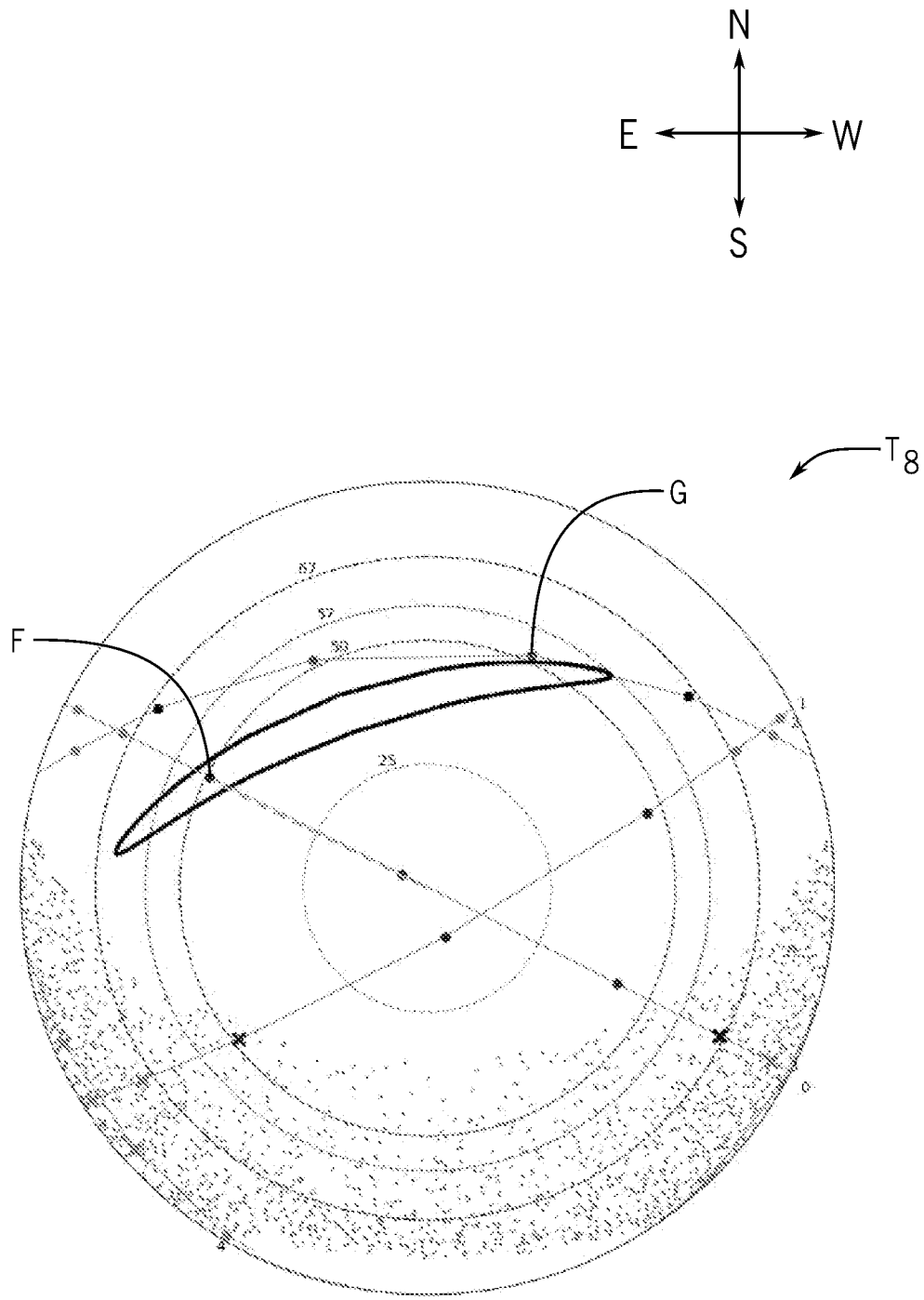

Returning to FIG. 19, after the antenna system switches to communicating with satellite F, the antenna system can track satellite F as satellite F moves in an Eastward direction within orbital plane 2. As an example of this tracking, FIGS. 20, 21, and 22 illustrate the position of the field of regard R at times $T_6$, $T_7$, and $T_8$. Tracking satellite F may be accomplished via electronically steering the beam of the one-dimensional phased array antenna and/or gimbaling the field of regard R. While tracking satellite F, the antenna system moves the field of array Y along the gimbaling axis 192 in a second gimbaling direction. The second gimbaling direction is the reverse of the first gimbaling direction (e.g., the backward direction discussed in connection with FIG. 12A). If the traveling direction of satellite F within orbital plane 2 approximately aligns with the gimbaling axis 192, the antenna system may move the field of array Y along the gimbaling axis 192 at a rate that approximately matches the orbital velocity of satellite F. This process of tracking satellite F (without switching to other satellites of orbital plane 2 or other orbital planes) may represent and/or include an example of single-satellite tracking.

Second Interplane Switching

Figure 23:
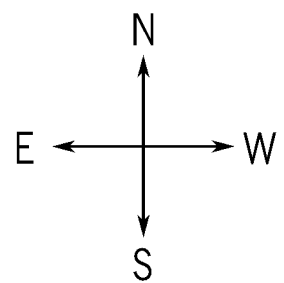
Figure 23:
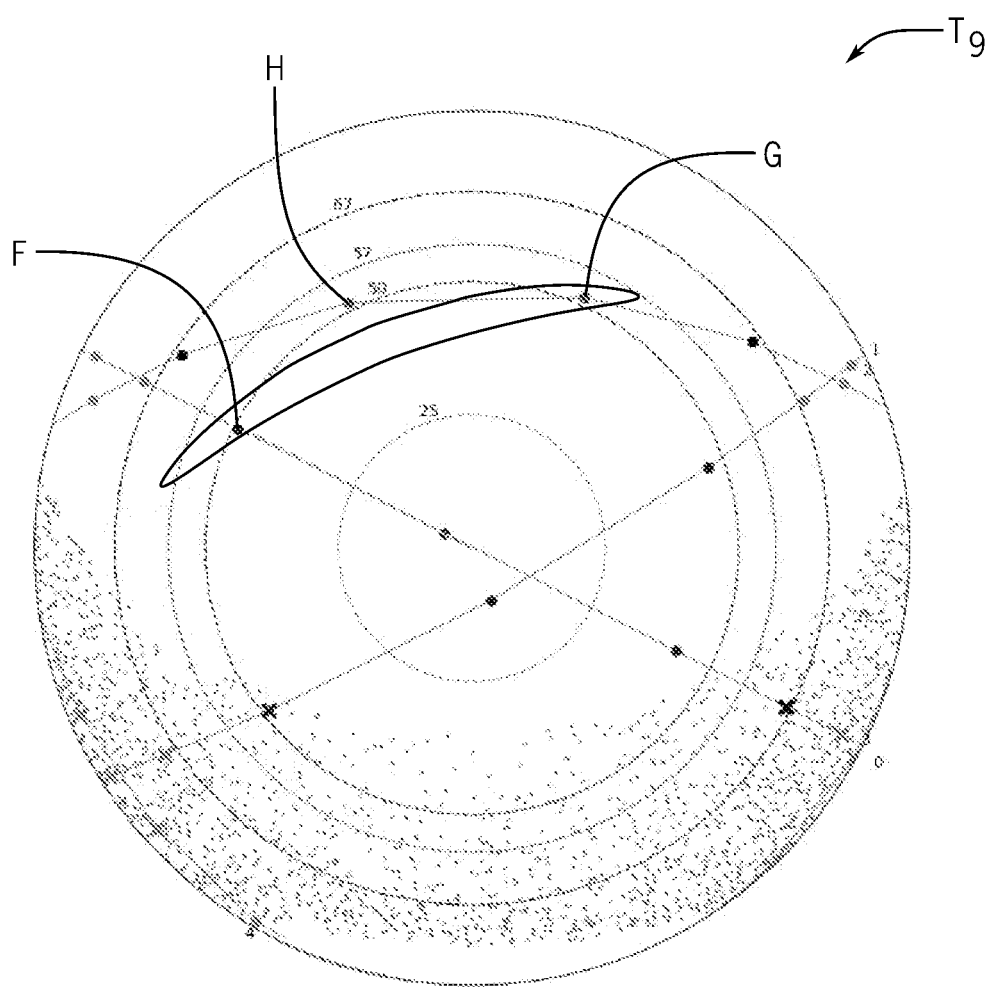
Figure 24:
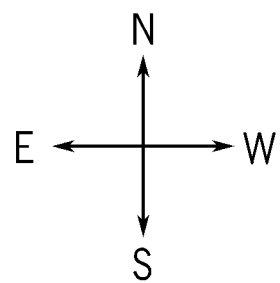
Figure 24:
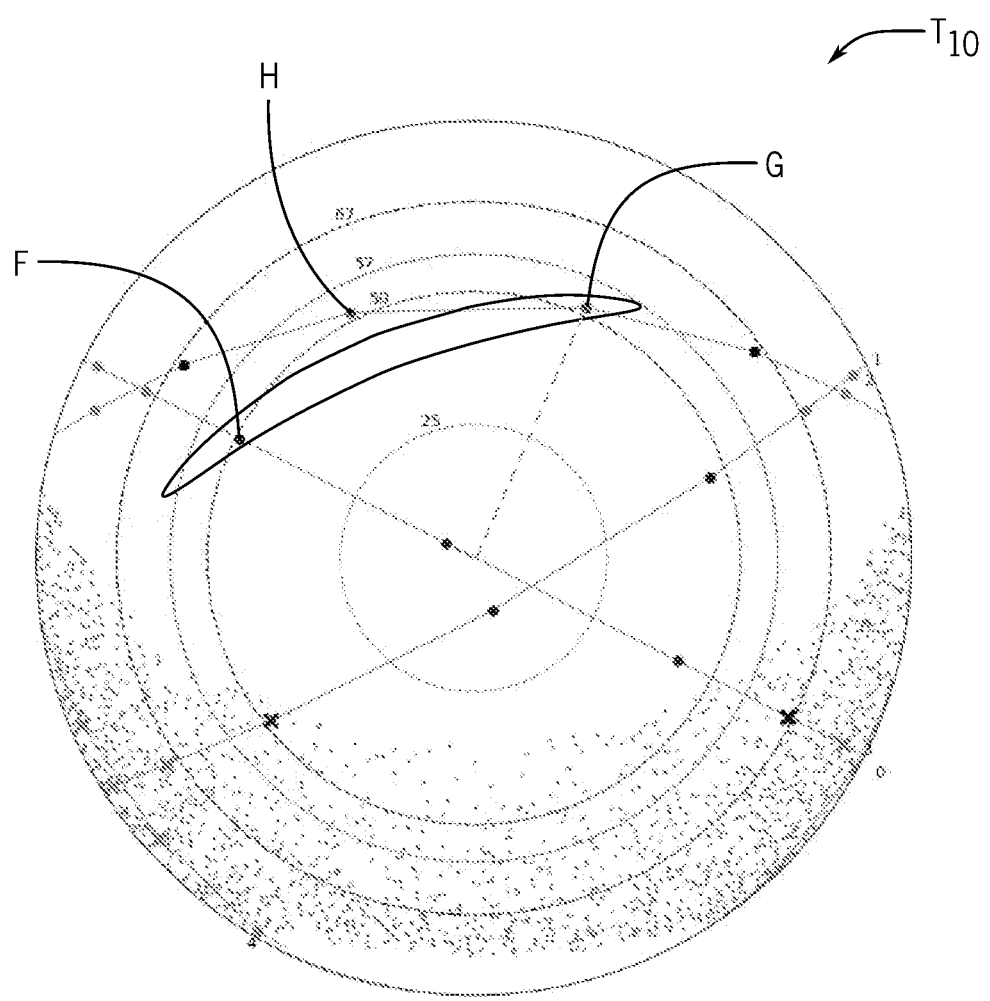
Figure 25:
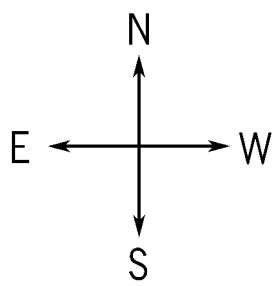
Figure 25:
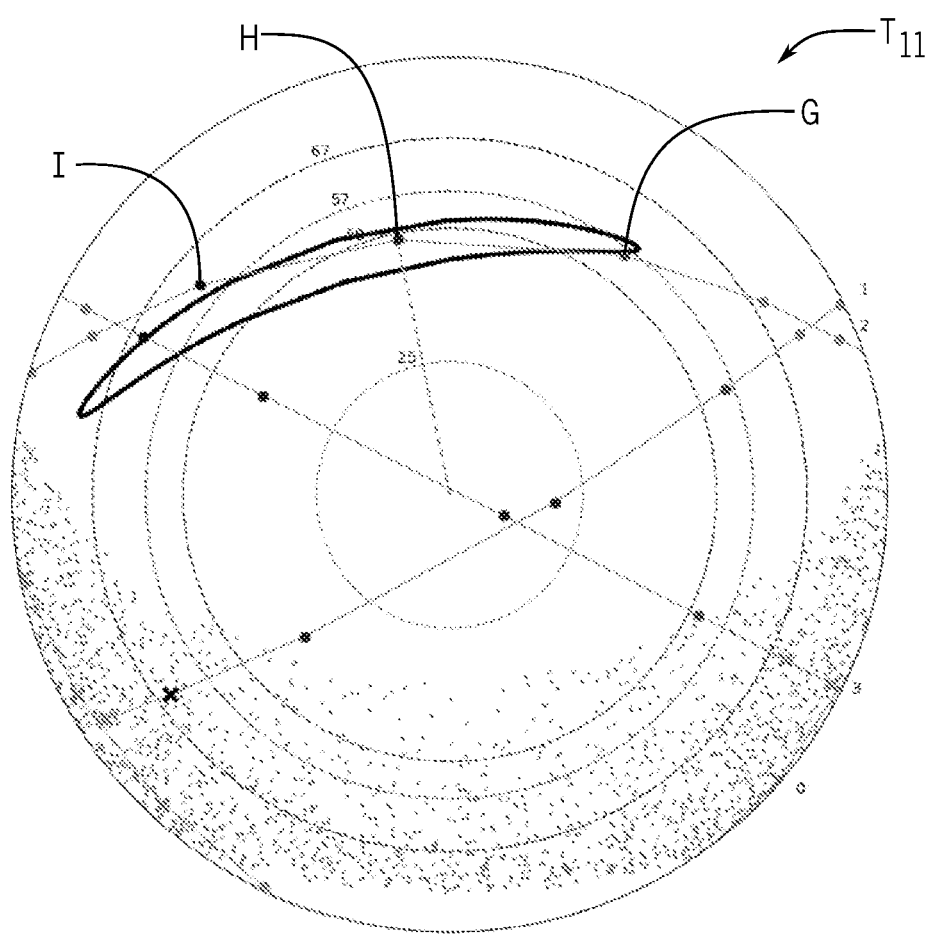

In some cases, the antenna system can perform single-satellite tracking until the field of regard R reaches a second switching position. FIG. 23 represents an example of the field of regard R at a second switching position. As shown in FIG. 23, this position facilitates communication with both satellite F of orbital plane 2 and a satellite G of orbital plane 3. At a time $T_9$ shown in FIG. 23, the antenna system is in communication with satellite F. At a time $T_{10}$ shown in FIG. 24, the antenna system switches to communicating with satellite G. The position of the field of regard R in FIG. 23 may be essentially the same as the position of the field of regard R in FIG. 23, and time $T_9$ may be essentially the same as (e.g., immediately following) time $T_{10}$.

The second switching position may be determined based on a variety of factors, including the factors used to determine the first switching position (such as avoidance of the GEO-belt interference zone Z, load-balancing within the satellite constellation, minimizing communication latencies, avoidance of geological obstacles, and mechanical gimbaling limitations). Further, determining the second switching position may involve selecting a most-suitable or optimal switching position from multiple potential switching positions. Referring to FIG. 6B, if the antenna system is performing single-satellite tracking of a satellite from orbital plane Y1, the potential second switching positions may include a position where the field of regard R includes an intersection between orbital plane Y1 and an orbital plane X3, and a position where the field of regard R includes an intersection between orbital plane Y1 and an orbital plane X4. In some cases, orbital planes X3 and X4 may represent adjacent orbital planes (e.g., orbital planes with adjacent RAANs) of satellite set X. In other examples, the antenna system may switch to an additional orbital plane of the first satellite set, an orbital plane of the second satellite set, or an orbital plane of a satellite set with an inclination not illustrated in FIG. 6B. Accordingly, the second switching position may be the same as or nearby the initial location of the field of regard F, but does not necessarily depend on or have any relation to the initial position.

Cyclical Satellite Tracking

Returning to FIG. 24, after the antenna system establishes communication with satellite G, the antenna system can communicate with satellites of orbital plane 3 in accordance with the intraplane tracking and switching techniques described above. For instance, at a time $T_{11}$ illustrated in FIG. 25, the antenna system has switched to communicating with a satellite H of orbital plane 3 and satellite G has moved out of the field of regard R. Once a satellite I of orbital plane 3 moves into a suitable communication position within the field of regard R (or satellite H moves into an unsuitable communication position), the antenna system can switch to communicating with satellite I. Intraplane tracking and switching can continue until a suitable position for switching communication to another orbital plane is reached, at which point hand-off to the other orbital plane may occur. This cyclical process of intraplane tracking and switching, satellite tracking, and interplane switching can repeat for any suitable amount of time, such as indefinitely or while the user terminal requests communication services.

In some cases, orbital plane 1 (and any orbital planes adjacent to orbital plane 1) may represent a main or primary orbital plane with which the antenna system communicates, and orbital plane 2 (and any orbital planes adjacent to orbital plane 2) may represent an intermediary or secondary orbital plane. For instance, once communication with orbital plane 1 becomes impractical or impossible (for example, due to GEO-belt interference), a satellite from orbital plane 2 may be used as a transition satellite that provides communication services while the field of regard R returns to a position that facilitates communication with an orbital plane adjacent to orbital plane 1. Accordingly, orbital plane 1 may be referred to as a talking plane and orbital plane 2 may be referred to as a traveling plane. In some cases, the antenna system may communicate with orbital plane 1 for a longer amount of time than orbital plane 2. As an illustrative example, during one cycle of intraplane and interplane tracking and switching, the antenna system may be in communication with orbital plane 1 for approximately an hour and in communication with orbital plane 2 for several minutes.

It may be generally advantageous for multiple satellites to be visible at all times within the field of regard R. For instance, to ensure continuous communication services, at least two satellites must be visible in the field of regard R during both intraplane and interplane switching. Further, while a single satellite may be visible within the field of regard R while satellite switching is not occurring, a communication lag or drop may occur if the satellite malfunctions and a "backup" (e.g., second) satellite is not available for communication. Thus, some embodiments of the present disclosure may select the number of satellites within orbital planes and/or the shape of the field of regard to maximize the occurrence of multiple satellites within the field of regard. Notably, in the examples discussed above, only a single satellite (satellite F) is visible within the field of regard R while the antenna system is in communication with orbital plane 2. Because the antenna system is generally in communication with orbital plane 2 for a significantly shorter period of time than orbital plane 1, ensuring two satellites are visible within the field of regard R while communicating with orbital plane 2 may be of less importance.

Timing of Satellite Communication Switches

In some cases, an antenna system may be directed to perform intraplane and interplane tracking and switching. For instance, the antenna system may receive an instruction that prompts the antenna system to switch from communicating with one satellite to communicating with another satellite. The instruction may include a point in time at which the communication switch is to occur. In one example, the instruction may also include information indicating a rate and a direction of electronic steering and/or gimbaling to be used for orienting the beam of the antenna system for communication with the other satellite. In other examples, the instruction may include a location of the satellite (or the antenna system may have previous knowledge of the location), and the antenna system may determine an appropriate rate and direction of electronic steering and/or gimbaling based on the location. Once the appropriate rates and directions of electronic steering and gimbaling have been determined or received, the antenna system can begin communicating with the other satellite at the specified point in time.

Such instructions may be provided to the antenna system in a variety of ways. In one example, a remote or backend server (for example, a gateway) may provide instructions to the antenna system. The server may provide instructions to multiple antenna systems, such as to a group of antenna systems located within a certain geographic region or a group of antenna systems communicating with certain satellites. In some cases, the server may send the instructions via satellites with which the antenna systems are communicating. In other words, the instructions may be sent to the antenna systems via the communication network provided by the satellite constellation. The instructions may be provided via any additional or alternative type of communication network or path.

The server may select a suitable satellite for communicating with the antenna system based on a variety of factors. In some cases, the server may select one or more suitable satellites based at least in part on locations of the satellites. In an illustrative example, the server may determine the location of a satellite using a model that tracks or predicts movement of satellites within the satellite constellation. The server may generate and/or maintain the model based on information such as the satellite's orbital velocity, orbital plane, and launch location. Additionally or alternatively, the server may generate and/or maintain the model based on periodically determining the location of the satellites (e.g., via a Global Positioning System (GPS) or other positioning system). This model may enable the server to determine which orbital planes will intersect with the field of regard of the antenna system as the antenna system movies along a gimbaling axis. In addition, the server may select a suitable satellite based at least in part on the communication load of the satellite. For instance, the server may periodically or continuously monitor the communication load of the satellite to determine when additional communication requests should be routed to other satellites (e.g., based on the other satellites having a smaller communication load). Further, the server may determine that a satellite is not suitable for communicating with the antenna system based on detecting that the satellite has moved to a location where communication is prevented between the satellite and the antenna system due to physicals obstacles (such as buildings, trees, or geological features). The server may select suitable satellites for communicating with the antenna system using any combination of these or additional factors.

The server may determine (and send to the antenna system) any number of satellites suitable for communicating with the antenna system at a time. In one embodiment, the server may determine a single satellite. For example, while the antenna system is communicating with a first satellite, the server may send an instruction indicating a second satellite to be used for communication. While the antenna system is communicating with the second satellite, the server may send an instruction indicating a third satellite to be used for communication, and so on. Sending instructions indicating one (or a small number) of subsequent satellites to be used for communication may enable the server to most effectively optimize and/or balance the communication load of a group of satellites. However, to minimize bandwidth and/or processing power consumed by generating and sending instructions, the server may send an instruction indicating multiple satellites. For instance, the instruction may indicate a communication path of 50, 100, or any suitable number of satellites. Based on a clock synchronized across the antenna system and the server, the antenna system may iteratively switch to communicating with each satellite within the communication path at times indicated within the instruction. Referring to FIGS. 14-25, such a clock may enable the antenna system to establish communication with various satellites in orbital planes 1, 2, and 3 in accordance with times $T_0$-$T_{11}$. Further, the server may update or revise a communication path to optimize communication services for the antenna system. For example, the server may determine that a satellite with which the antenna system is scheduled to establish communication is no longer suitable for communication due to an unexpected increase in the satellite's communication load. The server may therefore direct the antenna system to establish communication with a different satellite.

In some examples, the server may perform intraplane and interplane tracking and switching based at least in part on direct communication with satellites. For instance, rather than receiving an instruction indicating a satellite selected by a server, the antenna system may select a satellite suitable for communication based on a detecting that the satellite is available for communication within the field of regard of the antenna system. For instance, the antenna system may periodically or continuously scan for nearby satellites. In another example, the antenna system may receive communications from nearby satellites indicating that the satellites are available. In some cases, the antenna system may scan for nearby satellites or receive communications from nearby satellites via a sensor or mechanism other than the phased array antenna of the antenna system. For instance, the antenna system may include a sensor configured for detecting available satellites and may use the phased array antenna for transmitting and receiving data requested by the user terminal.

Systems and Methods for Tracking Non-Geosynchornous Satellites

Figure 26:
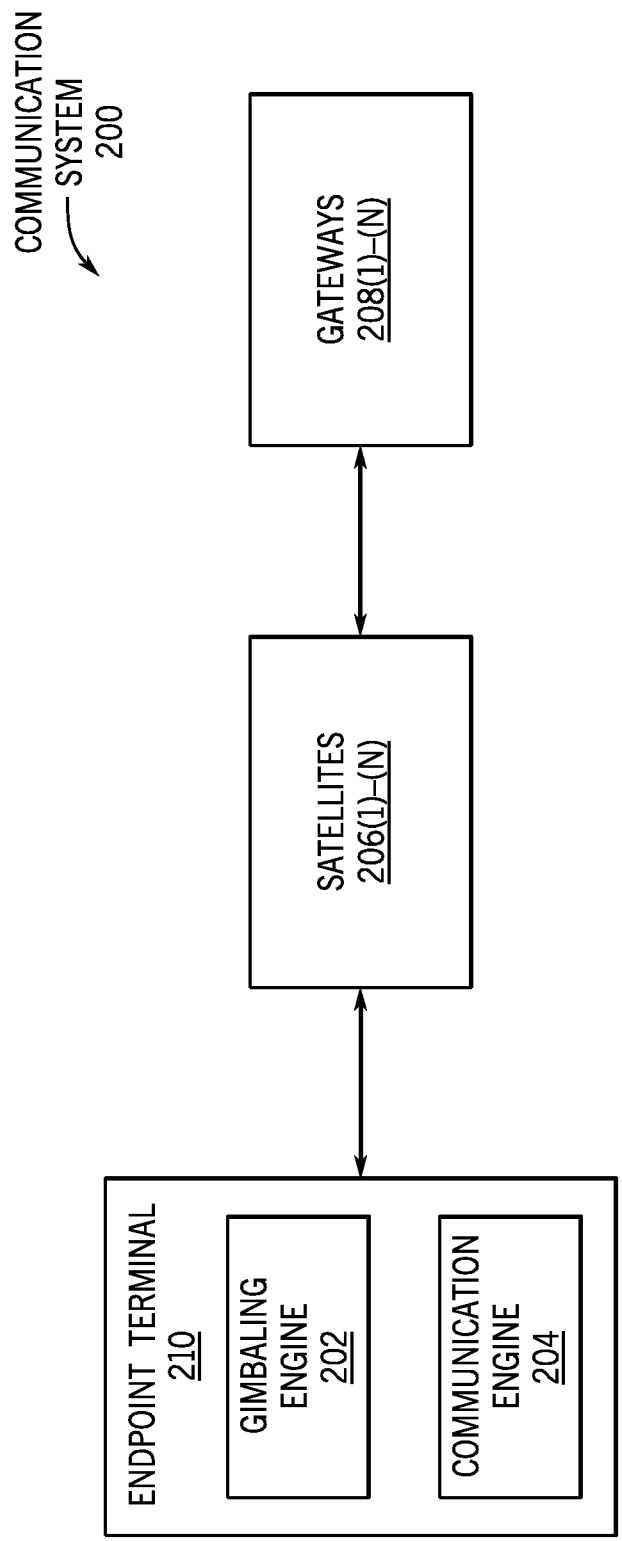
FIG. 26 is a block diagram illustrating components of a user or end point terminal in accordance with embodiments of the present disclosure.

FIG. 26 illustrates components in a block diagram of a non-limiting exemplary embodiment of a communication system 200. As shown in FIG. 26, the communication system 200 includes an endpoint terminal 210 in communication with satellites 206(1)-(N), which are in turn in communication with gateways 208(1)-(N). The endpoint terminal 210 includes a communication engine 204, which allows the endpoint terminal 210 to communicate with the satellites 206(1)-(N). For instance, the communication engine 204 may include a one-dimensional phased array antenna. The one-dimensional phased array antenna exchanges data with the gateways 208(1)-(N) via the satellites 206(1)-(N). Satellites 206(1)-(N) may include any of the satellites illustrated in the exemplary satellite constellations of FIG. 6A, 6B, or 6C, or any of the satellites A-I illustrated in FIGS. 14-25. In some examples, the communication engine 204 may control electronically steering the beam of the one-dimensional phased array antenna to track movement of the satellites 206(1)-(N). In some embodiments, the endpoint terminal 210 may also include a local communication interface, such as an Ethernet interface, a Wi-Fi interface, or other interface that allows other devices at the endpoint premises to connect to the network via the endpoint terminal 210.

The endpoint terminal 210 further includes a gimbaling engine 202 that facilitates gimbaling the phased array antenna along a gimbaling axis in first and second gimbaling directions. Gimbaling the phased array antenna may produce movement of the field of regard of the one-dimensional phased array antenna. In some embodiments, the gimbaling engine 202 may include a gimbaling mechanism that performs the gimbaling, as well as a processing device that directs or controls the gimbaling mechanism. Using intraplane and interplane tracking and switching techniques described above, the gimbaling engine 202 and the communication engine 104 may facilitate maintaining continuous or near-continuous communication between the endpoint terminal 210 and the satellites 206(1)-(N).

Actual embodiments of the illustrated devices will have more components included therein which are known to one of ordinary skill in the art. For example, each of the illustrated devices will have a power source, one or more processors, computer-readable media for storing computer-executable instructions, and so on. These additional components are not illustrated herein for the sake of clarity.

Figure 27:
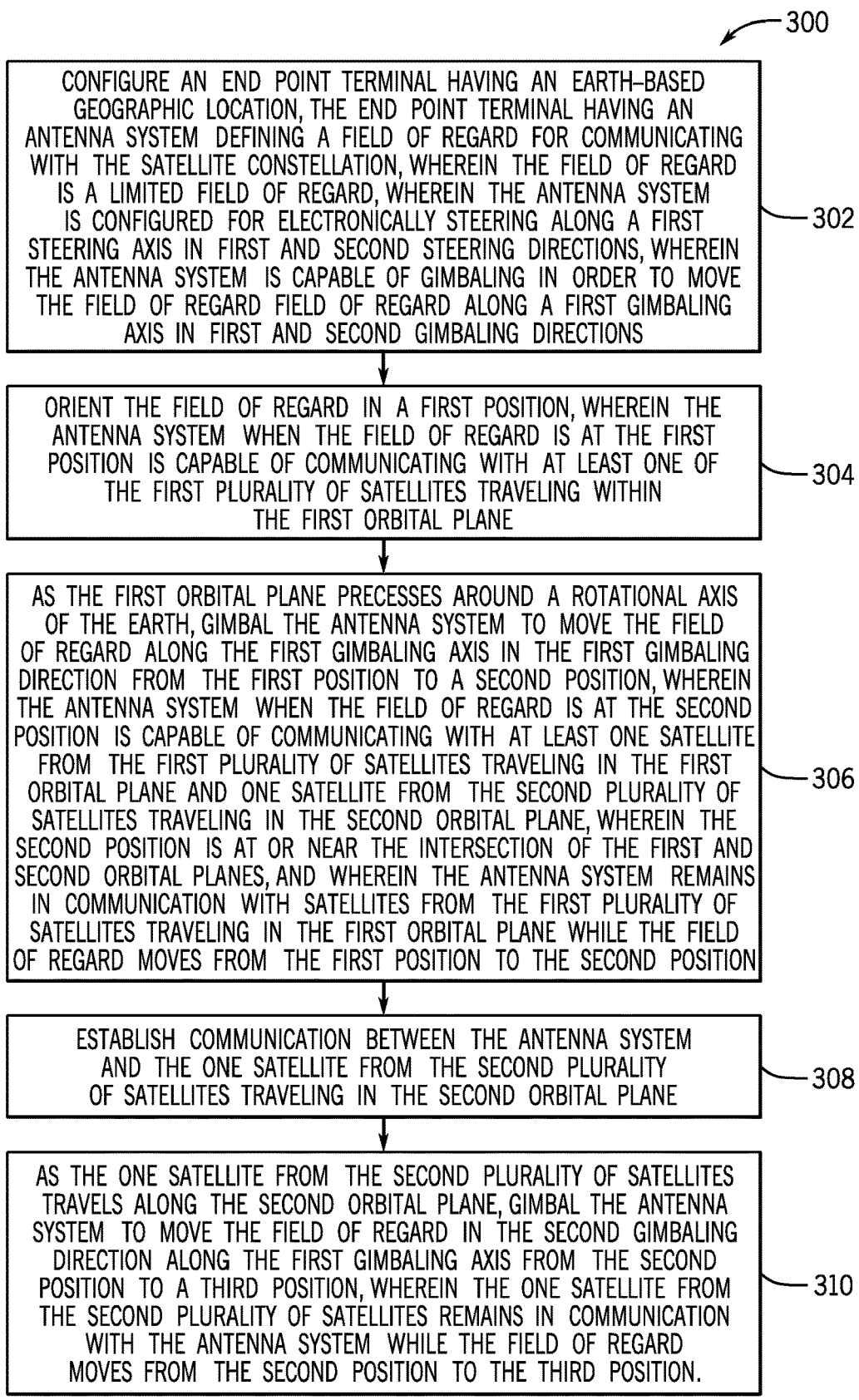
FIG. 27 is a flowchart illustrating a procedure for tracking non-geosynchronous satellites in accordance with embodiments of the present disclosure.

FIG. 27 is a flowchart that illustrates a non-limiting example embodiment of a process 300 for tracking non-geosynchronous satellites according to various aspects of the present disclosure. The process 300 is an example of a procedure suitable for use with the endpoint terminal 210 shown in FIG. 26 for facilitating communication between the endpoint terminal 210 and the satellites 206(1)-(N). In some embodiments, the process 300 (or a similar process) is executed repeatedly to cyclically perform the intraplane and interplane tracking and switching techniques described above.

At step 302, the process 300 includes configuring the end point terminal having an earth-based geographic location, the end point terminal having an antenna system defining a field of regard for communicating, wherein the field of regard is a limited field of regard, wherein the antenna system is configured for electronically steering along a first steering axis in first and second steering directions, and wherein the antenna system is capable of gimbaling in order to move the field of regard along a first gimbaling axis in first and second gimbaling directions.

At step 304, the process 300 includes orienting the field of regard in a first position, wherein the antenna system when the field of regard is at the first position is capable of communicating with at least one of a first plurality of satellites traveling within a first orbital plane.

At step 306, the process 300 includes, as the first orbital plane precesses around a rotational axis of the Earth, gimbal the antenna system to move the field of regard along the first gimbaling axis in the first gimbaling direction from the first position to a second position, wherein the antenna system when the field of regard is at the second position is capable of communicating with at least one satellite from the first plurality of satellites traveling in the first orbital plane and one satellite from the second plurality of satellites traveling in the second orbital plane, wherein the second position is at or near the intersection of the first and second orbital planes, and wherein the antenna system remains in communication with satellites from the first plurality of satellites traveling in the first orbital plane while the field of regard moves from the first position to the second position.

At step 308, the process 300 includes establishing communication between the antenna system and the one satellite from the second plurality of satellites traveling in the second orbital plane.

At step 310, the process 300 includes, as the one satellite from the second plurality of satellites travels along the second orbital plane, gimbaling the antenna system to move the field of regard in the second gimbaling direction along the first gimbaling axis from the second position to a third position, wherein the one satellite from the second plurality of satellites remains in communication with the antenna system while the field of regard gimbals from the second position to the third position.

While illustrative embodiments have been illustrated and described, it will be appreciated that various changes can be made therein without departing from the spirit and scope of the disclosure.

The embodiments of the disclosure in which an exclusive property or privilege is claimed are defined as follows:

1. A method of configuring an end point terminal for communication with a satellite constellation including a plurality of satellites in non-geosynchronous orbit (non-GEO), wherein at least a first plurality of satellites travel in a first orbital plane and a second plurality of satellites travel in a second orbital plane, wherein the first orbital plane intersects the second orbital plane at an intersection, the method comprising:

configuring the end point terminal having an Earth-based geographic location, the end point terminal having an antenna system defining a field of regard for communicating with the satellite constellation, wherein the field of regard is a limited field of regard, wherein the antenna system is configured for electronically steering along a first steering axis in first and second steering directions, wherein the antenna system is of configured for gimbaling in order to move the field of regard along a first gimbaling axis in first and second gimbaling directions;

orienting the field of regard in a first position, wherein the antenna system when the field of regard is at the first position is configured for communicating with at least one of the first plurality of satellites traveling within the first orbital plane;

as the first orbital plane precesses around a rotational axis of the Earth, gimbaling the antenna system to move the field of regard along the first gimbaling axis in the first gimbaling direction from the first position to a second position, wherein the antenna system when the field of regard is at the second position is configured for communicating with at least one satellite from the first plurality of satellites traveling in the first orbital plane and one satellite from the second plurality of satellites traveling in the second orbital plane, wherein the second position is at or near the intersection of the first and second orbital planes, and wherein the antenna system remains in communication with satellites from the first plurality of satellites traveling in the first orbital plane while the field of regard moves from the first position to the second position;

establishing communication between the antenna system and the one satellite from the second plurality of satellites traveling in the second orbital plane;

as the one satellite from the second plurality of satellites travels along the second orbital plane, gimbaling the antenna system to move the field of regard in the second gimbaling direction along the first gimbaling axis from the second position to a third position, wherein the one satellite from the second plurality of satellites remains in communication with the antenna system while the field of regard moves from the second position to the third position;

selecting the second position by determining, based on a model that predicts movement of satellites within the satellite constellation, a position wherein the antenna system is configured for communicating with at least one satellite from the first plurality of satellites and the one satellite from the second plurality of satellites, and the field of regard has less than a threshold amount of overlap with a GEO-belt interference zone, and selecting the second position by determining that a communication load of the one satellite from the second plurality of satellites is less than a threshold communication load when the field of regard is at the second position; and predicting, based on the model, a first point in time at which the field of regard is positioned at the second position, and directing, at the first point in time, the antenna system to switch from communicating with the at least one satellite from the first plurality of satellites to communicating with the one satellite from the second plurality of satellites.

2. The method of claim 1, wherein the first plurality of satellites travel in the first orbital plane at a first inclination and the second plurality of satellites travel in the second orbital plane at a second inclination, the first inclination being different from the second inclination.

3. The method of claim 1, wherein right ascension of the ascending nodes (RAANs) of the first plurality of satellites traveling in the first orbital plane are offset by a first amount relative to RAANs of the second plurality of satellites traveling in the second orbital plane.

4. The method of claim 3, further comprising establishing communication with a satellite from a third plurality of satellites traveling in a third orbital plane when the field of regard is at the third position, wherein RAANs of the third plurality of satellites traveling in the third orbital plane are offset by a second amount relative to the RAANs of the first plurality of satellites traveling in the first orbital plane.

5. The method of claim 4, wherein the RAANs of the first plurality of satellites traveling in the first orbital plane are adjacent to the RAANs of the third plurality of satellites traveling in the third orbital plane.

6. The method of claim 1, wherein the first gimbaling axis is aligned with an axis of precession of the first orbital plane.

7. The method of claim 6, wherein moving the field of regard along the first gimbaling axis from the first position to the second position comprises gimbaling the antenna system at a first gimbaling rate that corresponds to a precession rate of the axis of precession.

8. The method of claim 7, wherein moving the field of regard along the first gimbaling axis from the second position to the third position comprises gimbaling the antenna system at a second gimbaling rate that corresponds to an orbital velocity of the one satellite from the second plurality of satellites within the second orbital plane.

9. The method of claim 8, wherein the first gimbaling rate is different from the second gimbaling rate.

10. The method of claim 1, wherein the second gimbaling direction is the reverse of the first gimbaling direction.

11. The method of claim 1, further comprising selecting the third position by predicting, based on the model, a position wherein:
    the antenna system is configured for communicating with at least one satellite from a third plurality of satellites traveling in a third orbital plane and the one satellite from the second plurality of satellites; and
    a communication load of the at least one satellite from the third plurality of satellites is less than the threshold communication load when the field of regard is at the position.

12. The method of claim 11, further comprising:
    predicting, based on the model, a second point in time at which the field of regard is positioned at the third position; and
    directing, at the second point in time, the end point terminal to switch from communicating with the one satellite in the second orbital plane to communicating with one satellite from the third plurality of satellites.

13. The method of claim 1, wherein the first steering direction is orthogonal to the first and second gimbaling directions.

14. The method of claim 1, further comprising maintaining continuous communication between the antenna system and satellites within the first plurality of satellites while the field of regard gimbals from the first position to the second position.

15. The method of claim 14, wherein maintaining the continuous communication between the antenna system and satellites within the first plurality of satellites comprises:
    while the field of regard is at the first position, establishing communication between the antenna system and a first satellite from the first plurality of satellites;
    as the first satellite from the first plurality of satellites travels along the first orbital plane, electronically steering the antenna system to track the first satellite from the first plurality of satellites; and
    while the antenna system is configured for communicating with the first satellite from the first plurality of satellites, establishing communication between the antenna system and a second satellite from the first plurality of satellites.

16. The method of claim 15, wherein the second satellite from the first plurality of satellites is closer to the Earth-based geographic location of the end point terminal than the first satellite from the first plurality of satellites when communication is established with the second satellite from the first plurality of satellites.

17. The method of claim 1, further comprising maintaining continuous communication with the one satellite from the second plurality of satellites while the field of regard gimbals from the second position to the third position.

18. The method of claim 1, further comprising:
    when the field of regard is at the third position, establishing communication between the antenna system and one satellite from a third plurality of satellites traveling in a third orbital plane; and
    as the one satellite from the third plurality of satellites travels along the third orbital plane, gimbaling the antenna system to move the field of regard along a second gimbaling axis in a third gimbaling direction from the third position to a fourth position.

19. A communication system for communicating with a satellite constellation including a plurality of satellites in non-geosynchronous orbit (non-GEO), wherein at least a first plurality of satellites travel in a first orbital plane and a second plurality of satellites travel in a second orbital plane, wherein the first orbital plane intersects the second orbital plane at an intersection the system comprising;
    an end point terminal having an Earth-based geographic location;
    an antenna system coupled to the end point terminal, wherein the antenna system defines a field of regard for communicating with the satellite constellation, wherein the field of regard is a limited field of regard, wherein the antenna system is configured for electronically steering along a first steering axis in first and second steering directions, wherein the end point terminal is configured for gimbaling in order to move the field of regard along a first gimbaling axis in first and second gimbaling directions, and wherein the end point terminal:
        orients the field of regard in a first position, wherein the antenna system when the field of regard is at the first position is configured for communicating with at least one of the first plurality of satellites traveling within the first orbital plane;
        as the first orbital plane precesses around a rotational axis of the Earth, gimbals the antenna system to move the field of regard along the first gimbaling axis in the first gimbaling direction from the first position to a second position, wherein the antenna system when the field of regard is at the second position is configured for communicating with at least one satellite from the first plurality of satellites traveling in the first orbital plane and one satellite from the second plurality of satellites traveling in the second orbital plane, wherein the second position is at or near the intersection of the first and second orbital planes, and wherein the antenna system remains in communication with satellites from the first plurality of satellites traveling in the first orbital plane while the field of regard moves from the first position to the second position;
        establishes communication between the antenna system and the one satellite from the second plurality of satellites traveling in the second orbital plane;
        as the one satellite from the second plurality of satellites travels along the second orbital plane, gimbals the antenna system to move the field of regard in the second gimbaling direction along the first gimbaling axis from the second position to a third position, wherein the one satellite from the second plurality of satellites remains in communication with the antenna system while the field of regard moves from the second position to the third position;

selects the second position by determining, based on a model that predicts movement of satellites within the satellite constellation, a position wherein the antenna system is configured for communicating with at least one satellite from the first plurality of satellites and the one satellite from the second plurality of satellites, and the field of regard has less than a threshold amount of overlap with a GEO-belt interference zone, and selects the second position by determining that a communication load of the one satellite from the second plurality of satellites is less than a threshold communication load when the field of regard is at the second position; and predicts, based on the model, a first point in time at which the field of regard is positioned at the second position, and directing, at the first point in time, the antenna system to switch from communicating with the at least one satellite from the first plurality of satellites to communicating with the one satellite from the second plurality of satellites.

20. An end point terminal configured for communication with a satellite constellation including a plurality of satellites in non-geosynchronous orbit (non-GEO), wherein at least a first plurality of satellites travel in a first orbital plane and a second plurality of satellites travel in a second orbital plane, wherein the first orbital plane intersects the second orbital plane at an intersection, the end point terminal comprising:

a mount that secures the end point terminal to an Earth-based location;

an antenna array defining a field of regard for communicating with the satellite constellation, wherein the field of regard is a limited field of regard, and wherein the antenna array is configured for unidimensional electronic steering in first and second steering directions;

a gimbaling mechanism that gimbals the antenna array in order to move the field of regard along a first gimbaling axis in first and second gimbaling directions; and at least one processing device communicatively coupled to the gimbaling mechanism and the antenna array, wherein the processing device:

orients the field of regard in a first position, wherein the antenna system when the field of regard is at the first position is configured for communicating with at least one of the first plurality of satellites traveling within the first orbital plane;

as the first orbital plane precesses around a rotational axis of the Earth, gimbals the antenna system to move the field of regard along the first gimbaling axis in the first gimbaling direction from the first position to a second position, wherein the antenna system when the field of regard is at the second position is configured for communicating with at least one satellite from the first plurality of satellites traveling in the first orbital plane and one satellite from the second plurality of satellites traveling in the second orbital plane, wherein the second position is at or near the intersection of the first and second orbital planes, and wherein the antenna system remains in communication with satellites from the first plurality of satellites traveling in the first orbital plane while the field of regard gimbals from the first position to the second position;

establishes communication between the antenna system and the one satellite from the second plurality of satellites traveling in the second orbital plane;

as the one satellite from the second plurality of satellites travels along the second orbital plane, gimbals the antenna system to move field of regard in the second gimbaling direction along the first gimbaling axis from the second position to a third position, wherein the one satellite from the second plurality of satellites remains in communication with the antenna system while the field of regard gimbals from the second position to the third position;

selects the second position by determining, based on a model that predicts movement of satellites within the satellite constellation, a position wherein the antenna system is configured for communicating with at least one satellite from the first plurality of satellites and the one satellite from the second plurality of satellites, and the field of regard has less than a threshold amount of overlap with a GEO-belt interference zone, and selecting the second position by determining that a communication load of the one satellite from the second plurality of satellites is less than a threshold communication load when the field of regard is at the second position; and predicts, based on the model, a first point in time at which the field of regard is positioned at the second position, and directing, at the first point in time, the antenna system to switch from communicating with the at least one satellite from the first plurality of satellites to communicating with the one satellite from the second plurality of satellites.

21. The end point terminal of claim 20, wherein the antenna array includes a linear antenna array.

22. The end point terminal of claim 20, wherein the antenna array includes a curvilinear antenna array.

23. The end point terminal of claim 20, further comprising a parabolic trough that reflects signals transmitted by the antenna array, wherein a shape of the parabolic trough defines a shape of the field of regard.

24. The end point terminal of claim 20, further comprising a lens that focuses signals transmitted by the antenna array, wherein a shape of the lens defines a shape of the field of regard.

* * * * *

UNITED STATES PATENT AND TRADEMARK OFFICE
CERTIFICATE OF CORRECTION

| | | |
|---|---|---|
| PATENT NO. | : 11,735,818 B2 | |
| APPLICATION NO. | : 17/405552 | |
| DATED | : August 22, 2023 | |
| INVENTOR(S) | : Daniel A. Dueri, Raymond Tyler Rowe and Robert Baummer, Jr. | |

It is certified that error appears in the above-identified patent and that said Letters Patent is hereby corrected as shown below:

In the Claims

In Claim 1, Column 29, Line 62, delete "of" between "antenna system is" and "configured".

Signed and Sealed this
Twenty-third Day of July, 2024

Katherine Kelly Vidal
*Director of the United States Patent and Trademark Office*